(12) United States Patent
Osawa et al.

(10) Patent No.: US 6,764,373 B1
(45) Date of Patent: Jul. 20, 2004

(54) CHARGING SYSTEM FOR MOBILE ROBOT, METHOD FOR SEARCHING CHARGING STATION, MOBILE ROBOT, CONNECTOR, AND ELECTRICAL CONNECTION STRUCTURE

(75) Inventors: Hiroshi Osawa, Kanagawa (JP); Naoyasu Hosonuma, Saitama (JP)

(73) Assignee: Sony Corporation, Tokyo (JP)

( * ) Notice: Subject to any disclaimer, the term of this patent is extended or adjusted under 35 U.S.C. 154(b) by 127 days.

(21) Appl. No.: 09/698,566

(22) Filed: Oct. 27, 2000

(30) Foreign Application Priority Data

Oct. 29, 1999 (JP) ............................................. 11-308224

(51) Int. Cl.$^7$ .......................... A63H 30/00; A63H 29/22
(52) U.S. Cl. ....................... 446/175; 446/484; 446/454; 318/587; 180/169
(58) Field of Search ........................... 318/587, 568.11; 701/23, 24, 25; 446/484, 454, 456, 175; 700/245; 180/169, 168, 167; 439/924.1, 668, 669, 736, 22, 24, 25, 675

(56) References Cited

U.S. PATENT DOCUMENTS

| | | | | |
|---|---|---|---|---|
| 1,103,250 A | * | 7/1914 | Benjamin ..................... | 439/268 |
| 4,777,416 A | * | 10/1988 | George et al. .......... | 318/568.12 |
| 5,220,263 A | * | 6/1993 | Onishi et al. ................ | 318/587 |
| 5,440,216 A | * | 8/1995 | Kim ............................. | 318/587 |
| 5,466,181 A | * | 11/1995 | Bennett et al. .............. | 446/297 |
| 5,869,910 A | * | 2/1999 | Colens ......................... | 307/104 |
| 5,892,350 A | * | 4/1999 | Yoshikawa ................... | 320/107 |
| 5,995,884 A | * | 11/1999 | Allen et al. ................... | 318/587 |
| 6,030,229 A | * | 2/2000 | Tsutsui .......................... | 439/39 |
| 6,074,230 A | * | 6/2000 | Comerci et al. ............ | 439/284 |
| 6,429,016 B1 | * | 8/2002 | McNeil ........................ | 436/47 |
| 6,453,055 B1 | * | 9/2002 | Fukumura et al. .......... | 382/103 |
| 6,456,728 B1 | * | 9/2002 | Doi et al. .................... | 382/103 |
| 6,480,761 B2 | * | 11/2002 | Ueno et al. .............. | 318/568.1 |

FOREIGN PATENT DOCUMENTS

| | | | | |
|---|---|---|---|---|
| JP | 03284102 A | * | 12/1991 | ........... B60L/11/18 |
| JP | 05023264 A | * | 2/1993 | ............. A47L/5/28 |
| JP | 07191755 A | * | 7/1995 | ............ G05D/1/02 |
| JP | 2001125641 A | * | 5/2001 | ............ G05D/1/02 |

OTHER PUBLICATIONS

Rubenstein, Roy, "Be afraid . . . future dominance of robots", Mar. 12, 1997, Electronics Weekly, n1804, p. 16(2).*

Hada, Y.; Yuta, S., "Robust navigation and battery re–charging system for long term activity of autonomous mobile robot", 1999 Proceedings of the Ninth International Conference on Advanced Robotics. 99 ICAR, Tokyo, Japan, p. 297–302.*

Dudar, A. M.; Wagner, D. G.; Teese, G. D., "Mobile autonomous robot for radiological surveys", Westinghouse Savannah Rive Co., Aiken, SC, 1992, 12p.*

Dudar, e.; Teese, G.;Wagner, D., "SIMON: A mobile robot for floor contamination surveys", Westinghouse Savannah River Co Aiken, SC, 1991, 11p.*

\* cited by examiner

Primary Examiner—Derris H. Banks
Assistant Examiner—Urazula M Ceglelnik
(74) Attorney, Agent, or Firm—Frommer Lawrence & Haug LLP; William S. Frommer; Darren M. Simon

(57) ABSTRACT

A charging system for a mobile robot includes the mobile robot that is battery-driven and moves in a self-controlled way within a work space, and a charging station for accommodating the mobile robot for a battery charging operation. The charging system includes visible recognition data arranged in a predetermined location of the charging station, an image pickup unit mounted on the mobile robot, a calculating unit for calculating a range and a bearing from the mobile robot to the charging station, based on an image picked up by the image pickup unit, and a searching unit for causing the mobile robot to search for the charging station, based on the calculation result provided by the calculating unit. Since the mobile robot searches for the charging station using a camera for recognizing the visible recognition data, a charging operation is automated.

34 Claims, 24 Drawing Sheets

DIRECTION OF APPROACH
OF MOBILE ROBOT 1

FIG. 31
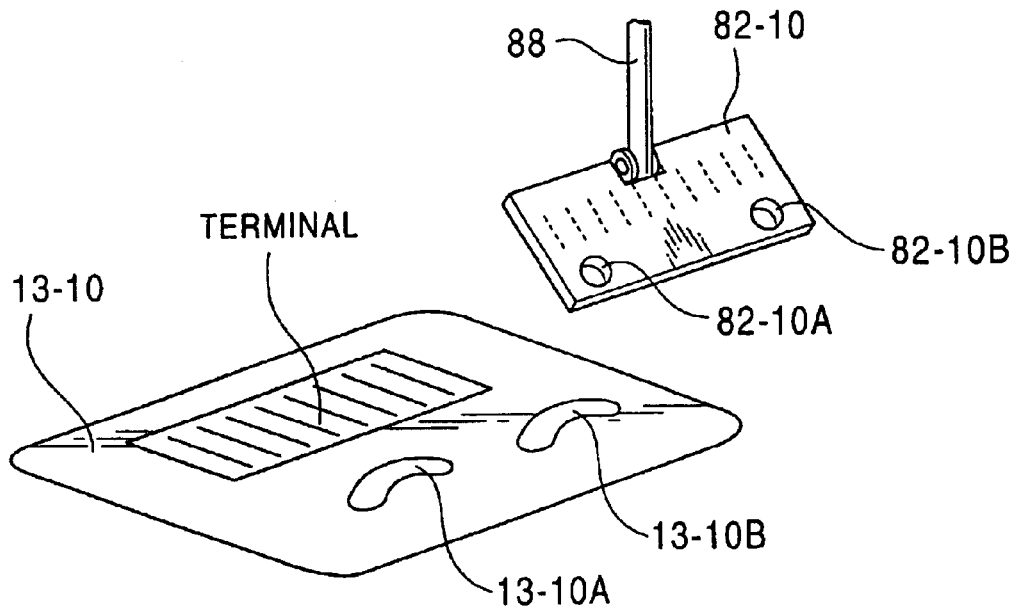
FIG. 32
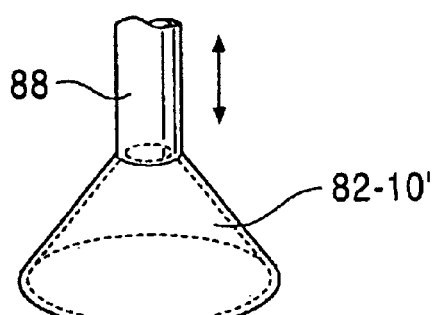
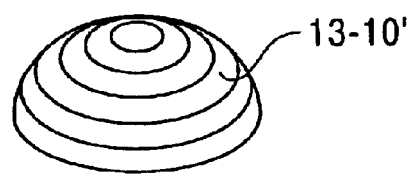

DIRECTION OF APPROACH
OF MOBILE ROBOT 1

CHARGING SYSTEM FOR MOBILE ROBOT, METHOD FOR SEARCHING CHARGING STATION, MOBILE ROBOT, CONNECTOR, AND ELECTRICAL CONNECTION STRUCTURE

BACKGROUND OF THE INVENTION

1. Field of the Invention

The present invention relates to a mobile robot which generally or partly imitates living mechanisms of human beings or animals and, particularly, to a mobile robot which bipedally or quadrupedally freely walks or crawls (in a trackless manner) within a work area or space.

The present invention also relates to a mobile robot that is driven by a rechargeable battery with no umbilical power cable connected, and freely and tracklessly moves within a work space, and to a charging mechanism for charging a battery in the mobile robot. More particularly, the present invention relates to a mobile robot of the type which stops at a charging station for automatic recharging when power remaining in the battery drops during self-controlled operation, and which departs from the charging station to resume normal operation at the end of the charging, and to a charging mechanism for charging the battery in the mobile robot.

2. Description of the Related Art

The term robot is said to be derived from Slavic word Robota (slave machine). In Japan, robots started to be widely used from the 1960s, and most of the robots were then industrial robots such as multiarticulate robot arms (manipulators) and conveyance robots for automating a production line in a plant or for use in an unmanned plant.

Research and development have advanced in moving (ambulatory) robots that use feet in walking and stable walk control for the mobile robots, such as pet-type or toy robots which imitate the living mechanisms and the behavior of four-footed animals such as the dog and the cat, and human-type robots which imitate the living mechanism and the behavior of human beings or apes. Expectations of commercializing these robots are currently mounting. The ambulatory robot is unstable and presents more difficulty in posture control and ambulation control than crawling robots. However, the ambulatory robot is excellent in that the ambulatory robot is flexible in walking and running, for instance, going up and down the stairs, and striding over an obstacle.

An installed robot, such as a robot arm, which is firmly planted at a particular location, is used for the assembling and selection of parts in a limited and local work space only. In contrast, the work space of the mobile robot is not limited. The mobile robot moves along a track or freely on a non-tracked area, performing any predetermined job. The mobile robot thus provides various services, instead of the human beings, the dogs, and other living things.

Humanoid robots coexist under the living environments of human beings, and perform a diversity of simple, risky and difficult jobs involved in the industrial and production activity of the human beings. For instance, the humanoid robots are expected to play an important role in various activities, such as maintenance work in nuclear power plants, thermoelectric power plants, and petrochemical plants, conveyance and assembly operation of parts in production plants, cleaning operations on high-rise buildings, and rescue activities in the site of a fire. The humanoid robot moves around or over an obstacle using the two feet thereof, reaching the site of activity in a self-controlled way, and performs a job exactly as instructed.

The mobile robots for entertainment imitating the dog or the cat, namely toy robots, have the feature of living together in a close relationship, rather than assisting the human beings in difficult jobs. The toy robots are easy to handle, compared with real animals, and offers sophisticated functions, compared with conventional toys.

Conventional toy machines offer fixed interactive relationship with a user operation, and cannot be modified according to the user's preference. As a result, the user may grow tired of the toy that simply repeats the same operation. In contrast, although the toy robot performs the operation in accordance with time-series action model, the toy robot modifies the time-series action model in response to an external stimulation such as a user operation. Specifically, by imparting a "learning effect" to the toy robot, the user enjoys preferable action patterns of which the user is free from being tired.

The toy robot may be programmed to dynamically respond to the user action as an owner, for instance, "praising", "playing with", "petting", "stroking", "chastising", or "beating". For instance, the toy robot may respond by "being pleased", "fawning on", "pouting", "chastising", "barking", or "wagging". The user thus enjoys an education simulation of the toy robot. The toy robot bipedally or quadrupedally walks within a room at home as a non-tracked work space, moving around or over an obstacle, freely and automatically in a self-controlled manner.

The above-discussed robots are motorized mechanical devices, thereby needing power feeding thereto.

Electric power is supplied from a utility AC supply through a power cable to a robot fixed at a particular location, such as the already-discussed robot arm, or to a robot that moves within a limited radius of action or along a limited action pattern.

It is impossible to feed power to the mobile robot moving around in a self-controlled fashion from the utility AC power supply, because the power cable limits the radius of action of the mobile robot. Self-propelled driving using a battery is a logical choice for the mobile robot. The battery-driven mobile robot runs in a diversity of work spaces, such as a living area of human beings, without any physical limitation such as the location of a wall outlet or the length of power cable.

The battery-driven robot needs battery charging, however. Although the mobile robot is used as an automatic device, a charging operation is an issue that needs to be addressed to construct a fully automatic device. The battery replacement for charging or the connection of a power connector are troublesome to the user.

A "charging station" has been introduced to perform the battery charging of the mobile robot in a reliable and fully automatic fashion. The charging station provides space dedicated to the battery charging of the mobile robot.

When the robot detects a drop in the power remaining in the battery during the self-propelled and self-controlled operation, the robot suspends the operation thereof, and automatically returns to and stops at the charging station. The charging station establishes electrical connection between the robot and the a power supply thereof, thereby supplying power to the battery of the robot. When the battery is fully charged or recovers the power thereof to a predetermined level, the electrical connection to the power supply is disconnected. The mobile robot departs from the charging station, and resumes the operation thereof that was once suspended.

With a plurality of charging stations arranged within a work space, the mobile robot receives power supplying from the charging station closest thereto. The mobile robot thus moves from station to station for charging, thereby expanding the radius of action thereof. On the other hand, one single charging station may be shared by a plurality of mobile robots. The charging function of the robot may partly be transferred to the charging station, and the required specifications of the robot itself may be made less severe, and the weight and cost of the mobile robot are reduced.

To smoothly and automatically put the mobile robot into a charging operation with the charging station in the middle of a job, the mobile robot needs to be guided into the charging station (or the mobile robot searches for the location of the charging station), while detecting the position thereof and controlling itself for accurate and reliable electrical connection with the power supply.

The mobile robot may be relatively easily set into the charging station if the robot (such as a conveyance robot) moves only along a predetermined fixed track. The charging station is arranged in the midway of the normal track, and the mobile robot comes to the charging station in one of the predefined steps, and performs the charging operation, practically without any interruption of the job.

Because of its freedom in motion, the robot, which is allowed to freely walk in a self-controlled manner, such as a humanoid robot or a toy robot, is associated with the difficulty of the position detection and alignment of the robot when the robot is set into the charging station.

SUMMARY OF THE INVENTION

Accordingly, it is an object of the present invention to provide a charging mechanism for a mobile robot which is battery-driven in a self-controlled fashion.

It is another object of the present invention to provide an excellent charging mechanism for a mobile robot which is battery-driven and freely and tracklessly moves within a work space.

It is yet another object of the present invention to provide an excellent charging mechanism which performs an charging operation using a charging station to charge the mobile robot which is battery-driven and freely and tracklessly moves within a work space.

It is yet another object of the present invention to provide an excellent charging mechanism which accurately and reliably establishes an electrical connection between a charging station and a mobile robot which stops at the charging station for a charging operation there.

In a first aspect of the present invention, a charging system for a mobile robot includes the mobile robot that is battery-driven and moves in a self-controlled way within a work space, and a charging station for accommodating the mobile robot for a battery charging operation. The charging system includes visible recognition data arranged in a predetermined location of the charging station, an image pickup unit mounted on the mobile robot, a calculating unit for calculating a range and a bearing from the mobile robot to the charging station, based on an image picked up by the image pickup unit, and a searching unit for causing the mobile robot to search for the charging station, based on the calculation result provided by the calculating unit.

In accordance with the first aspect, the mobile robot searches for the charging station based on the image picked up by a camera, with the visible recognition data arranged on the predetermined location on the charging station, as a target. The charging operation of the mobile robot moving on a non-tracked area is thus automated.

A communication unit for performing data exchange between the mobile robot and the charging station may be arranged. The communication unit may use any of interface protocols such as the RS-232C, IEEE1284, USB, i-Link, IrDA. The communication unit may be used for a guiding operation (for accurate alignment) when the mobile robot is received into the charging operation, or to notify of the start and end of charging.

The visible recognition data may be a print medium glued onto the surface of the charging station. A plurality of print media may be glued onto the surface of a three-dimensional object, such as a cylinder, a quadratic prism, or a sphere. In this way, the mobile robot detects the visible recognition data from a plurality of directions, and thus approaches to the charging station from various directions.

The visible recognition data may be displayed on a screen of a display unit. The visible recognition data is dynamically used in a manner that prevents the visible recognition data from being merged into the environment of the workspace. The visible recognition may be changed in response to a range from the mobile robot.

The visible recognition data may be a combination of colors and patterns. The visible recognition data may be a two-dimensional bar code or other visible marks.

By arranging the visible recognition data on an elevated portion of the charging station, the mobile robot detects the charging station from a far distance.

At least one of the charging station and the mobile robot may include an indicator indicating the condition of a battery, such as "Now charging", "Charging complete (with a battery fully charged)", or "Abnormal charging".

The charging station further includes a transmitter that transmits at least one of light ray, infrared ray, sound wave, ultrasonic wave, radio wave, and magnetic field, and the mobile robot includes a receiver for receiving the wave transmitted from the transmitter. In such a case, the calculating unit calculates the range and the bearing from the mobile robot to the charging station, based on at least one of the image provided by the image pickup unit and data received by the receiver. The charging station is accurately and quickly searched for.

Preferably, the wave transmitted by the transmitter is easily discriminated and separated from other signals created within the work space.

The mobile robot may include a head unit which performs a scanning motion with respect to a torso unit, and at least one of the image pickup unit and the receiver is arranged on the head unit. The charging station is thus easily detected through the scanning motion.

The transmitter may transmit at least two signal waves, from among light ray, infrared ray, sound wave, ultrasonic wave, radio wave, and magnetic field, and the receiver may switch the received signal in response to the range between the charging station and the mobile robot. The robot searches for the charging station using a sound wave, having diffractive property, in a far range where obstacles are dispersedly present midway, and switches to light ray or infrared light ray, having rectilinear propagation property, for precise searching in a near range.

The transmitter may project a light ray through a slit, and may change the pattern of the slit depending on the direction of light projection. With this arrangement, the mobile robot approaches the charging station from a plurality of directions with the single transmitter.

The transmitter may transmit at least two signal waves that are different in output intensity and frequency component. When a high-frequency signal is transmitted at a high intensity while a low-frequency signal being transmitted at a low intensity, an area where the high-frequency component only is received is considered to be relatively far from the charging station. When the mobile robot enters an area where a low-frequency component is received, the receiver detects that the mobile robot is closer to the charging station.

The charging station may include a communication unit for exchanging data with a device other than the devices of the charging system. The communication unit is a network interface card (NIC), for instance, and an external host system may remote-control the charging station through a network.

The transmitter may be arranged external to the charging station. The charging station may be searched for using a GPS (Global Positioning System).

The mobile robot may be of the four-footed type which quadrupedally walks like a dog, and includes a power connector on the abdomen of the torso unit thereof, the charging station may include a concaved receptacle, and a power connector arranged on the inner bottom portion of the receptacle, and the receptacle may support the mobile robot in the lying down position thereof.

The charging station may include, on the wall thereof, color patterns painted in at least two colors, and the mobile robot may search for the charging station, based on the positional relationship of the color patterns in an image provided by the image pickup unit.

The mobile robot may be of the four-footed type which quadrupedally walks like a dog, and may include a power connector on the hip portion of the torso unit thereof, the charging station may include a receptacle with a bowl-shaped concave, and a generally semi-spherical projection on the generally central position of the bowl-shaped concave, and the receptacle may support the mobile robot in the sitting position thereof.

The mobile robot may be of the four-footed type which quadrupedally walks like a dog, and may include a power connector on the hip portion of the torso unit thereof, the charging station may include a receptacle with a bowl-shaped, rotationally symmetric concave, and a generally semi-spherical, rotationally symmetric projection on the generally central position of the bowl-shaped concave, and the receptacle may support the mobile robot in the sitting position thereof at any angle.

The charging operation metaphorically represents feeding the dog in the sitting position thereof, and is interesting in the entertainment point of view.

The mobile robot may have a tapered portion on at least one of a head unit, and shoulders and hip portions of a torso unit, and the charging station may includes a generally U-shaped structure having an inner wall which receives the tapered portion formed on the mobile robot. The charging station may include a generally U-shaped structure having an inner wall which receives the tapered portion formed on the mobile robot, and on the deepest inside position of the U-shaped structure, a lip having a connector arranged on the top surface thereof. Each terminal of the connector may extend inwardly deeply into the U-shaped structure.

The mobile robot may be ambulatory, and an electrode terminal may be arranged on the sole of at least one foot. The electrical connection is established in normal walking.

The charging system may include at least one electromagnet for generating a magnetic field that connects and disconnects the connector of the mobile robot to and from the connector of the charging station.

The charging station may include a drive mechanism for placing the mobile robot in an appropriate engagement position therewith. With this arrangement, the mobile robot needs no precise alignment mechanism, the required specifications of the robot is made less severe, and the weight and cost of the mobile robot are reduced.

The charging station may include a generally U-shaped structure that receives the mobile robot, and a grip unit for gripping the mobile robot within the U-shaped structure. The charging station may be used as a carrying case with the mobile robot gripped therewithin. The U-shaped structure of the charging station protects the mobile robot against impacts that may be applied thereon when in transit.

The mobile robot may be of the type that quadrupedally walks like a dog, and the charging station may have a kennel-like configuration, and at least one connector may be arranged on the inner wall of the charging station.

In a second aspect of the present invention, a method for searching for a charging station, based on a signal wave transmitted by a transmitter arranged external to the charging station in a charging system including a mobile robot that is battery-driven and moves in a self-controlled way within a work space, and the charging station for accommodating the mobile robot for a battery charging operation, includes the steps of teaching the position of the charging station based on the signal wave from the transmitter after the mobile robot has been once placed on the charging station, and searching for the charging station by calculating the range and bearing to the charging station, based on the signal wave from the transmitter, with the mobile robot at any position within the work space.

In a third aspect of the present invention, a method for searching for a charging station, based on a signal wave transmitted by a transmitter arranged external to the charging station in a charging system including a mobile robot that is battery-driven and moves in a self-controlled way within a work space, and the charging station for accommodating the mobile robot for a battery charging operation, includes the steps of storing beforehand, in a memory of the mobile robot, the position information of the charging station with respect to a reference position set in accordance with the position of the transmitter, and searching for the charging station by calculating the position of the mobile robot with respect to the reference position, based on the signal wave from the transmitter with the mobile robot at any position within the work space, and reading the position information from the memory to calculate the range and the bearing to the charging station.

In a fourth aspect of the present invention, a method for searching for a charging station, based on a signal wave transmitted by a transmitter arranged external to the charging station in a charging system including a mobile robot that is battery-driven and moves in a self-controlled way within a work space, and the charging station for accommodating the mobile robot for a battery charging operation, includes the calculating step in which the mobile robot calculates the position thereof with respect to the reference position set in accordance with the position of the transmitter, based on the signal wave from the transmitter, the calculating step in which the charging station calculates the position of thereof with respect to the reference position, based on the signal wave from the transmitter, the communicating step in which the charging station communicates the position information thereof to the mobile robot, and the searching step in which the mobile robot searches for the charging station by calculating the range and bearing to the charging station through relative relationship between the positional information.

In a fifth aspect of the present invention, a mobile robot being ambulatory and having at least a torso unit and at least two foot units, includes an electrode terminal for power feeding, at the end of at least one of the two foot units. With the arrangement of the mobile robot, the electrical connection between electrodes is established in normal walking.

In a sixth aspect of the present invention, a mobile robot being ambulatory and having at least a torso unit and at least two foot units, includes an electrode terminal for power feeding, on one of the abdomen of the torso unit and the back of the torso unit.

In a seventh aspect of the present invention, a mobile robot being ambulatory and having at least a torso unit and at least two foot units, includes an electrode terminal for power feeding, at the end of the tail. With this arrangement, the electrical connection between electrodes is established by a charming action such as the wagging of the tail.

In an eighth aspect of the present invention, a connector having a generally semi-spherical projection, is cut into at least a tip thereof and one frustohemispherical slice, each serving as a connection terminal. The tip of the generally semi-spherical projection terminal may serve as a signal line, and the frustohemispherical terminal may serve as a power line. With this arrangement, an erratic connection between connectors is duly prevented.

In a ninth aspect of the present invention, an electrical connection structure performs electrical connection with connectors mutually in contact, wherein one connector is probe-like, and the other connector is mesh-like, and wherein the electrical connection is established with the probe-like connector is inserted into the mesh-like connector at any position. The probe-like connector may have a plurality of terminals arranged along the longitudinal direction thereof, and the mesh-like connector may have a plurality of layers.

In a tenth aspect of the present invention, and electrical connection structure performs electrical connection with connectors mutually in contact, wherein the electrical connection structure includes at least one electromagnet which connects and disconnects one connector to and from the other connector.

These and other objects, features and advantages will be readily understood from the following detailed description when read in connection with the drawings.

BRIEF DESCRIPTION OF THE DRAWINGS

FIG. 31 shows a mechanism for engaging connectors in the charging station 80-10 of the tenth embodiment of the present invention;

FIG. 32 shows the connection mechanism of connectors in a modification of the tenth embodiment of the present invention;

DESCRIPTION OF THE PREFERRED EMBODIMENTS

Figure 1:
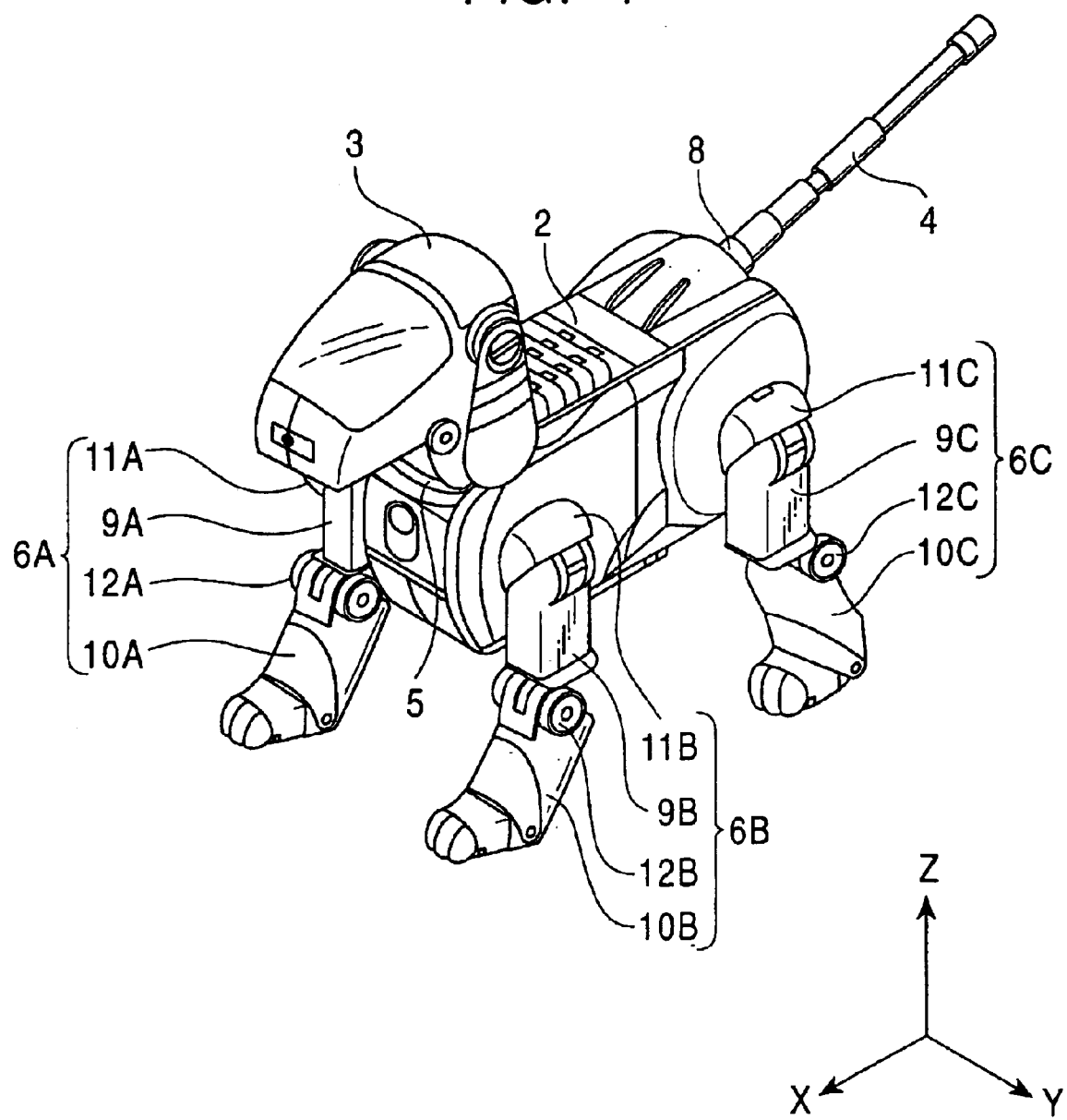
FIG. 1 is an external perspective view showing a mobile robot 1 of the present invention that quadrupedally walks.

The present invention covers a charging mechanism which performs a charging operation using a charging station to a mobile robot, particularly, a battery-driven mobile robot that freely and tracklessly moves within a work space. The present invention may also be implemented in a mobile robot of the type which moves along a fixed track only.

In the discussion that follows, a quadrupedally walking robot is described. The present invention is not limited to this robot, and is implemented in ambulatory robots walking using two feet, four feet, and six feet, or robots having a crawling mechanism for locomotion.

The embodiments of the present invention are now discussed, referring to the drawings.

FIG. 1 is an external perspective showing a quadrupedally walking robot of the present invention. As shown, the mobile robot 1 is a multiarticulate robot that models the shape and construction of an animal having four limbs. The mobile robot 1 of this embodiment is a toy robot that is designed imitating the shape and construction of the dog, which is a typical pet of human beings. The mobile robot 1 expresses reactions in response to the action of a user in a way coexistent in the living environment of the human beings.

The mobile robot 1 includes a torso unit 2, a head unit 3, a tail 4, and four limbs, namely, foot units 6A–6D.

The head unit 3 is connected to the front end of the torso unit 2 through a neck joint 5 that has freedoms about the axes of roll, pitch and yaw (as shown). The head unit 3 includes a CCD (Charge-Coupled Device) camera 15 corresponding to the "eye" of the dog, a microphone 16 corresponding to the "ear" of the dog, a loudspeaker 17 corresponding to the "mouth" of the dog, and a touch sensor 18 corresponding to the touch of the dog. Optionally, more sensors for the five senses may be included.

The tail 4 is connected to the rear end of the torso unit 2 via a tail joint 8 having freedoms about the roll axis and the pitch axis, in a manner such that the tail 4 is curved upward to the end thereof or freely wags.

Foot units 6A and 6B are front feet, and foot units 6C and 6D are hind feet. The foot units 6A–6D are respectively composed of thighs 9A–9D and heels 10A–10D, and are respectively connected to the torso unit 2 on the side walls at the front and the back thereof. The thighs 9A–9D are connected to the torso unit 2 through shoulder and hip joints 11A–11D having freedom about each of the roll and pitch axes. The thighs 9A–9D are respectively connected to the heels 10A–10D via knee joints 12A–12D, each having freedom about the pitch axis.

The freedom of motion of the mobile robot 1 is actually provided by the rotation of the motor arranged at each axis (not shown). The number of degrees of freedom in the mobile robot 1 is not limited to any particular number and does not limit the scope of the present invention.

Figure 2:
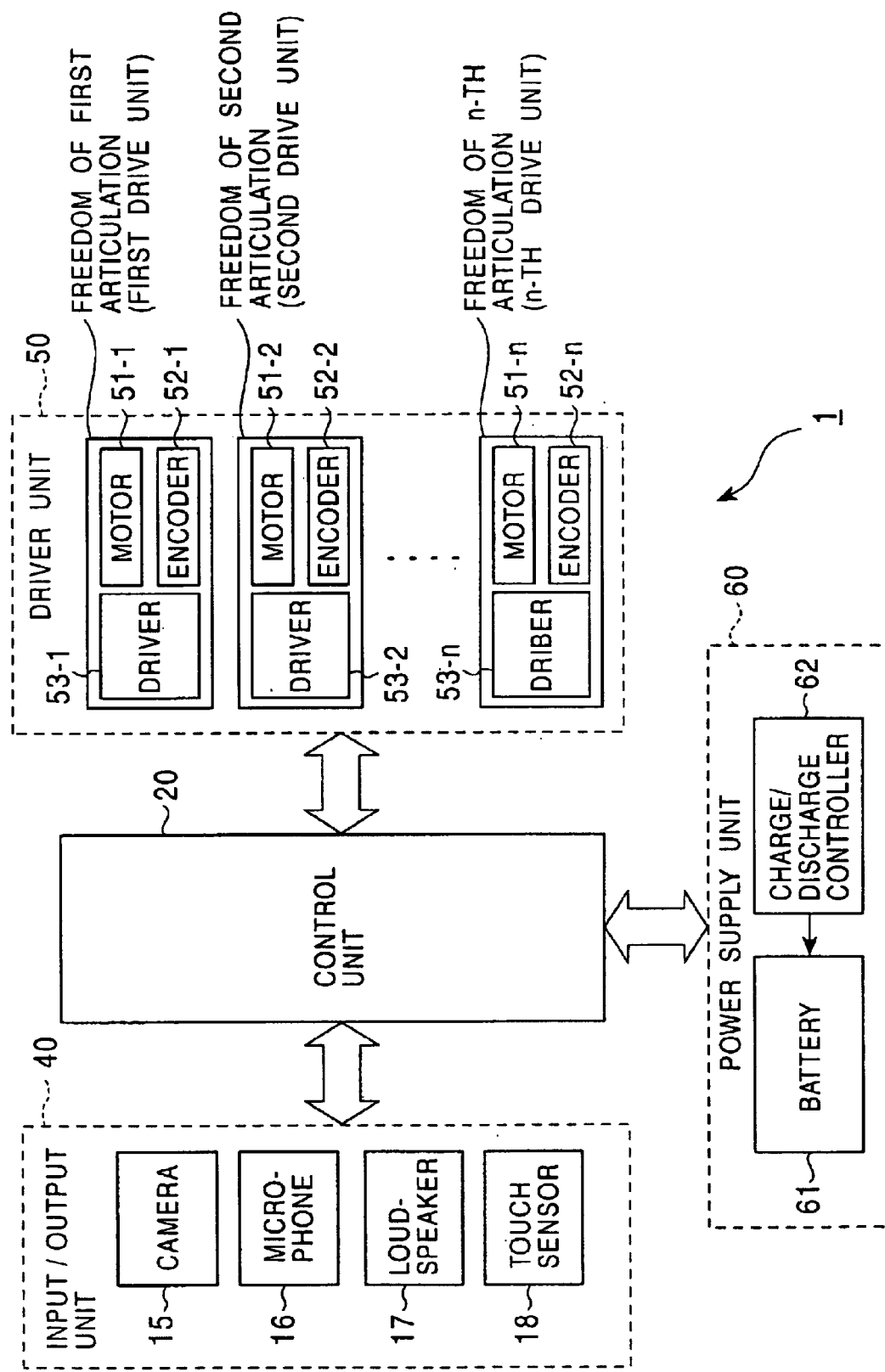
FIG. 2 diagrammatically shows the electrical and control system of the mobile robot 1.

Referring to FIG. 2, the electrical and control system of the mobile robot 1 is shown. As shown, the mobile robot 1 includes a control unit 20 for generally controlling the operation of the mobile robot 1 and for processing data, an input/output unit 40, a driver unit 50, and a power supply unit 60. Theses units are now discussed.

The input/output unit 40 includes, as input devices, a variety of sensors for the five senses, such as the CCD camera 15 serving as the eye of the mobile robot 1, the microphone 16 serving as the ear, and the touch sensor 18 serving as the touch. The input/output unit 40 also includes, as an output device, the loudspeaker 17 serving as the mouth, and other devices, other than mechanical motion units such as foot units.

With the CCD camera 15, the mobile robot 1 recognizes the shape and color of any object present in the workspace. Besides the vision means such as the camera, the mobile robot 1 may also be equipped with receivers for receiving transmitted waves such as infrared light ray, sound wave, ultrasonic wave, radio wave. In this case, in response to the outputs of the sensors for receiving the waves, the mobile robot 1 can calculate the range and bearing to the source of the waves (as will be discussed later).

The driver unit 50 is a functional module for mechanically driving the mobile robot 1 in response to a predetermined action pattern commanded by the control unit 20, and is composed of blocks arranged at the neck joint 5, the tail joint 8, the shoulder and hip joints 11A–11D, the knee joints 12A–12D about the roll, pitch and yaw axes. Since the mobile robot 1 has n degrees of freedom at each joint as shown, the driver unit 50 thus includes n blocks, each including a motor 51 for driving a respective mechanical unit about a predetermined axis, an encoder 52 for detecting the angle of rotation of the motor 51, and a driver 53 for adaptively controlling the angle and speed of rotation of the motor 51 based on the output from the encoder 52.

The power supply unit 60 is a functional module for feeding power to each electrical circuit in the mobile robot 1. The mobile robot 1 of the present invention is a battery-driven and self-controlled robot, and the power supply unit 60 includes a rechargeable battery 61, and a charge/discharge controller 62 for controlling the charge/discharge state of the rechargeable battery 61.

The rechargeable battery 61 is a battery pack in which a plurality of lithium ion battery cells is packaged.

The charge/discharge controller 62 detects the power remaining in the rechargeable battery 61 by measuring the voltage across the terminals of the rechargeable battery 61, the charging and discharging currents of the rechargeable battery 61, and the ambient temperature of the rechargeable battery 61. The charge/discharge controller 62 thus determines the start time and stop time of the charging operation. The start time and stop time of the charging operation determined by the charge/discharge controller 62 are reported to the control unit 20, and serve as triggers for starting and ending the charging operation by the mobile robot 1. The charging operation will be discussed later.

The control unit 20 is the "brain" of the mobile robot 1, and is mounted in the head unit 3 of the mobile robot 1, for instance.

Figure 3:
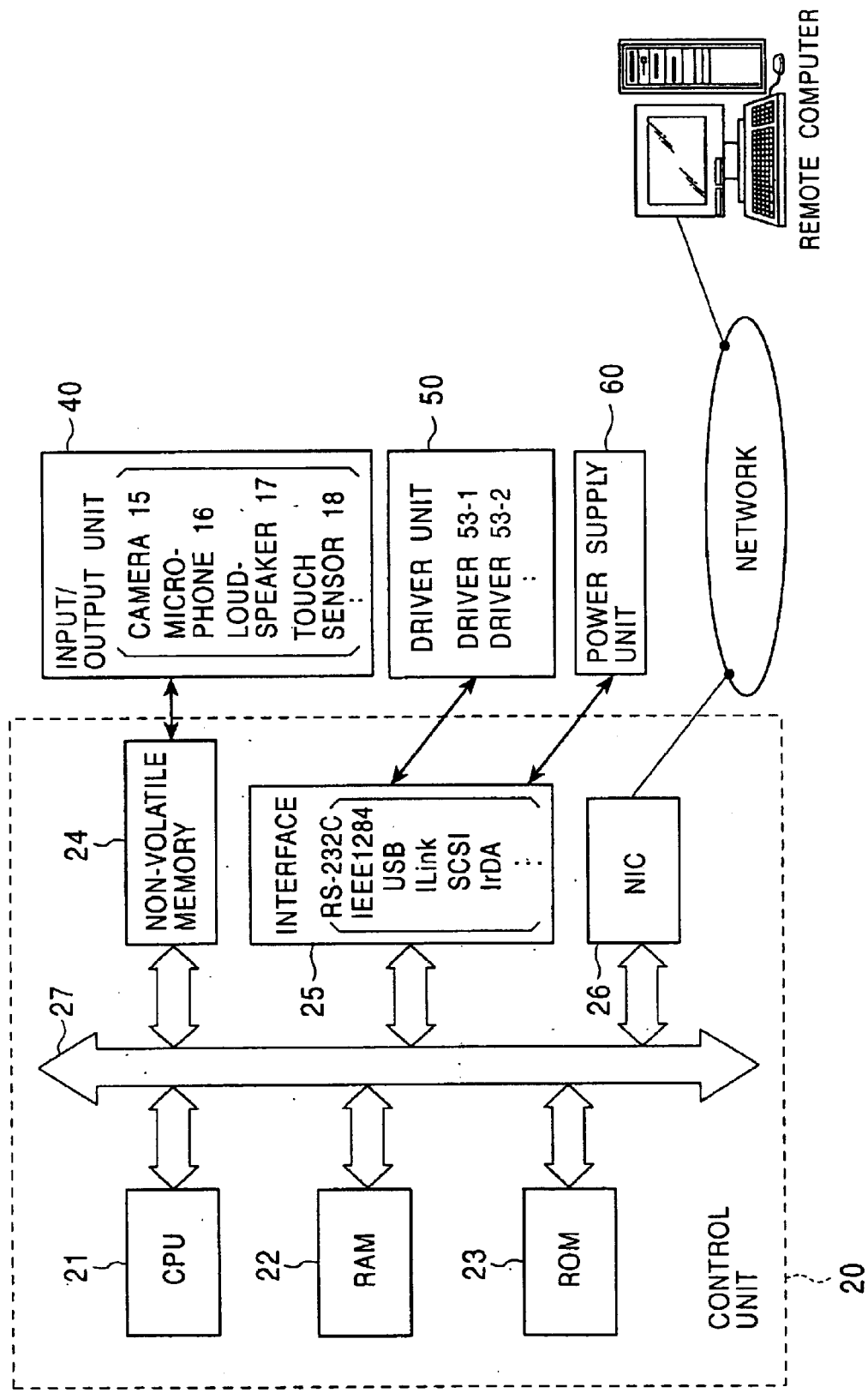
FIG. 3 shows the construction of a control unit 20 in detail.

Referring to FIG. 3, the control unit 20 is illustrated in more detail. As shown, the control unit 20 includes a CPU (Central Processing Unit) 21 as a main controller, connected to memories and peripheral components and devices via buses. Devices on a bus 27 are assigned unique addresses (memory address or I/O addresses), and the CPU 21 can communicate with a particular device on the bus 27 by designating a corresponding address.

A RAM (Random Access Memory) 22 is a non-volatile rewritable memory such as DRAM (Dynamic RAM), and stores program codes to be executed by the CPU 21, and temporarily stores work data.

A ROM (Read Only Memory) 23 is a memory dedicated to permanently storing programs and data. The program codes stored in the ROM 23 include a self-diagnosis test program that is executed at the power on of the mobile robot 1, and control programs for defining the action of the mobile robot 1. The control programs include a "sensor output processing program" for processing sensor outputs from the camera 15 and the microphone 16, an "action command program" for generating an action pattern of the mobile robot 1 based on a "time-series model"/*/, and a "drive control program" for controlling the motors and the sound output from the loudspeaker 17 in accordance with the generated action pattern. Besides normal walking and running, the generated action patterns may include charming actions such as "shaking", "waiting", "sitting", and the bark or cry of the dog such as "bowwow".

/*/Time-series Model

The techniques of generating the action pattern of a mechanical apparatus such as a robot in accordance with a time-series model, and of updating the time-series model by learning an external stimulation are disclosed in Japanese Unexamined Patent Application Publication No. 11-2150 assigned to the assignee of this invention. Japanese Unexamined Patent Application Publication No. 11-129275, also assigned to the assignee of this invention, discloses a "robotic apparatus" which has an emotion instinct model based on an action, and updates the emotion instinct model in response to input information. Japanese Unexamined Patent Application Publication No. 11-129279 discloses a "robotic apparatus" that creates an action in accordance with a variety of action models such as an emotion model, an instinct model, a learning model, and a growth model.

A non-volatile memory 24 is an EEPROM (Electrically Erasable and Programmable ROM), and stores data to be successively updated, in a non-volatile fashion. The data to be successively updated is the time-series model that defines the action pattern of the mobile robot 1.

Through the sensors, the mobile robot 1 receives the actions by the user as the owner, such as "praising", "playing with", "petting", "stroking", "chastising", or "beating", as stimulations, and then expresses its emotions and feelings in accordance with the time-series model stored in the non-volatile memory 24. For instance, the mobile robot 1 responds by the reactions such as "being pleased", "fawning on", "pouting", "chastising", "barking", or "wagging". A learning effect is also imparted to the mobile robot 1 to successively update the time-series model stored in the non-volatile memory 24 in response to the stimulation input to the sensors. Through the learning effect, the action pattern of the mobile robot 1 is varied. The mobile robot 1 thus adaptively reacts in a manner that keeps the user from being tired of and is consistent with the user's own preference. The user thus enjoys an education program in a game playing manner.

An interface 25 connects the control unit 20 with devices external to the control unit 20 for data exchanging therebetween. For instance, the interface 25 exchanges data with the camera 15, microphone 16, and loudspeaker 17. The interface 25 also exchanges data and commands with the drivers 53-1, . . . , in the driver unit 50. Furthermore, the interface 25 exchanges the charging start time and charging stop time signals with the power supply unit 60.

The interface 25 includes general-purpose interfaces for communication with computer peripheral devices, such as an RS (Recommended Standard)-232C serial interface, an IEEE (Institute of Electrical and Electronics Engineers) 1284 parallel interface, a USB (Universal Serial Bus) interface, an i-Link (IEEE 1394) interface, and an SCSI (Small Computer System Interface). The interface 25 thus exchanges programs and data with an external device, such as the charging station 80 (to be discussed later).

The interface 25 may include an infrared communication (IrDA) interface, thereby performing wireless communication with an external device, such as the charging station 80. A transceiver for the infrared communication is preferably arranged on an end portion of the mobile robot 1, i.e., the head unit 3 or tail 4, from the sensitivity standpoint.

The control unit 20 includes a network interface card (NIC) 26, and communicates with an external computer system for data exchange via a LAN (Local Area Network) or the Internet, and may remote-control the mobile robot 1 using the resources of the remote computer. The time-series model to be stored in the non-volatile memory 24 is supplied to the mobile robot 1 via the network.

As discussed in the Description of the Related Art, a self-controlled and self-driven robot, such as the mobile robot 1 of this embodiment, is battery charged using the charging station. The charging station is a docking station that docks the mobile robot 1 to charge the battery thereof. Such a charging station has widely been used in the industrial fields of robots as a method for reliably and fully automating battery charging of mobile robots.

Upon detecting a drop in the power remaining in the rechargeable battery 61 in the middle of self-driven and self-controlled job, the mobile robot 1 stops the job and comes to the charging station 80. The mobile robot 1 establishes electrical connection with the power supply in the charging station 80, thereby receiving power for the rechargeable battery 61. When the rechargeable battery 61 is fully charged or recovers the voltage thereof to a predetermined level, the mobile robot 1 electrically disconnects itself from the charging station 80, departs from the charging station 80, and resumes the job once suspended.

The external appearance of the charging station 80 is not limited to any particular one. When the toy robot 1 takes the external appearance of a dog as shown in FIG. 1, the charging station may be configured to imitate a bed or kennel for the dog. With this arrangement, the kennel is metaphorically represented by the charging station at which the mobile robot 1 stops for recharging, and increases the fun to play with the mobile robot 1 besides normal operation of the mobile robot 1.

When a plurality of charging stations are arranged within the work space, the mobile robot 1 is recharged at a charging station closest thereto. The mobile robot 1 thus travels between the charging stations, expanding the radius of action thereof. A single charging station is shared among a plurality of mobile robots, and the number of the charging stations is reduced. The charging function of the robot may partly be transferred to the charging station, and the required specifications of the robot itself may be made less severe, and the weight and cost of the mobile robot are reduced.

Figure 4:
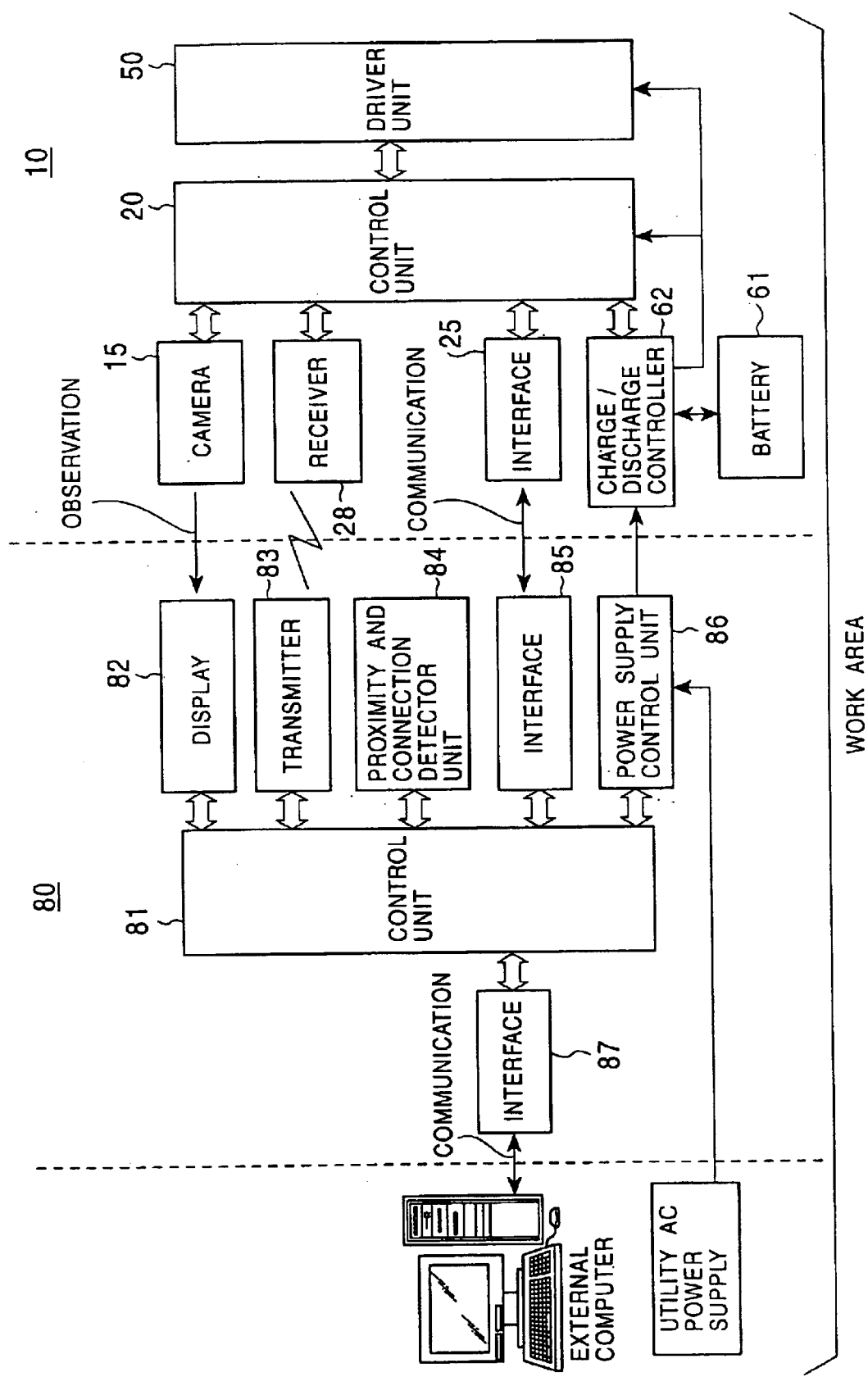
FIG. 4 is a functional block diagram diagrammatically showing a work space which accommodates a charging station 80 and the mobile robot 1.

FIG. 4 is a functional block diagram diagrammatically showing a work space in which the charging station 80 and the mobile robot 1 are arranged.

The charging station 80 of this embodiment includes display unit 82, transmitter 83, proximity and connection detector 84, interface 85, power supply control unit 86, and interface 87 for communication with other devices such as an external computer and system arranged in the work space. These units are generally controlled by a control unit 81.

The display unit 82 is a LCD (Liquid-Crystal Display) unit or a CRT (Cathode Ray Tube) unit, capable of presenting graphics. The display unit 82 presents visible recognition data having a predetermined combination of colors and patterns (for instance, two-dimensional bar code such as cyber codes/**/ or other visual marks) so that the charging station 80 are visible and recognizable at a distance.

/**/Cyber Code

Figure 38:
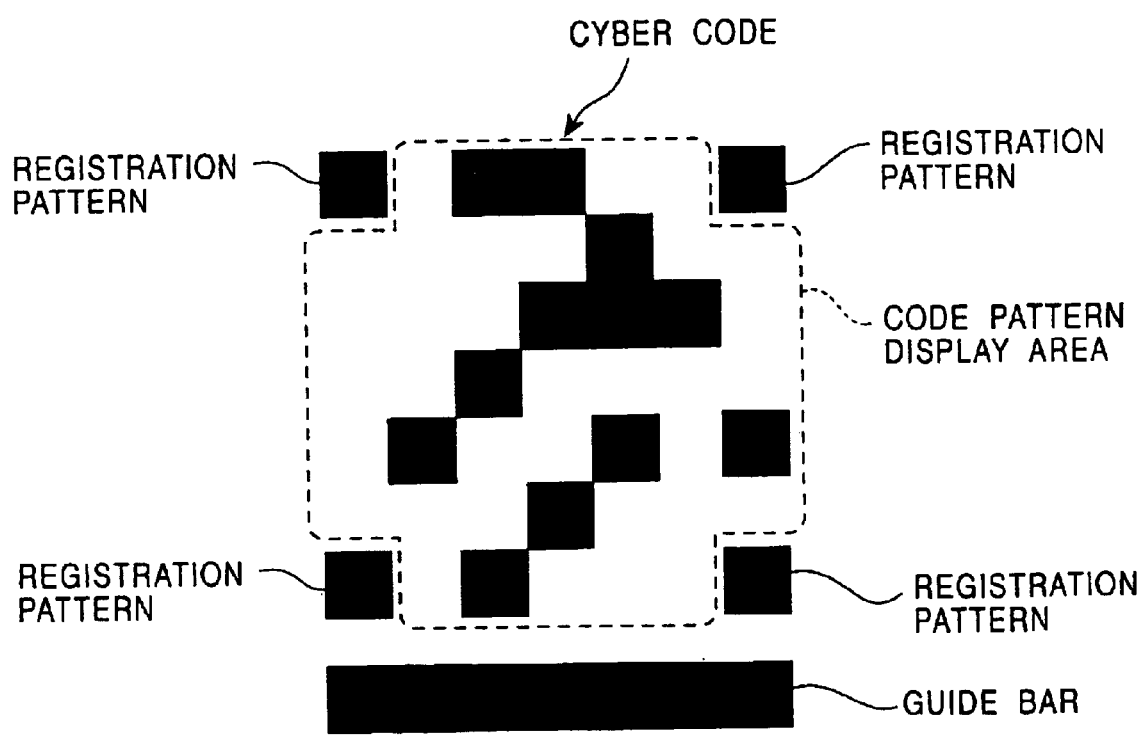
FIG. 38 diagrammatically shows the layout of a cyber code.

A cyber code is one type of two-dimensional bar codes, and includes a guide bar area indicating the presence of a cyber code, and a code pattern display area for indicating a two-dimensional code pattern as shown in FIG. 38. The code pattern display area is formed of a matrix of n cells×m cells (7 cells×7 cells in FIG. 38), and identification information is conveyed by expressing binary data of white and black in each cell. The cells at the four corners of the code pattern display area are always black as an alignment (registration) pattern, rather than identification information. The recognition process of the cyber code is divided into two major steps of detecting a guide bar from within a picked up image, aligning with the cyber code using the registration pattern, and deriving the identification information by recognizing the code pattern. The cyber code is disclosed in Japanese Unexamined Patent Application Publication No. 10-184350 ("Image Processing Apparatus, Method, and Storage Medium"), which is assigned to the assignee of this invention.

The mobile robot 1 determines the position of the charging station 80 by searching for the recognition data such as a visual mark displayed on the display unit 82, based on the image picked up by the camera 15. As necessary, the mobile robot 1calculates the range to the charging station 80 based on the current position thereof and the size of the pattern of the recognition data picked up by the CCD camera 15. The charging station 80 may change the pattern or the size of the pattern displayed on the display unit 82. The mobile robot 1 may change the searching algorithm depending on a change in the range to the charging station. The mobile robot 1 may take a short length of step for position adjustment before docking at the charging station 80 as it approaches the charging station 80.

When the pattern of the recognition data displayed on the display unit 82 is merged into the background (within the work space), the color and pattern may be switched to the ones having higher recognition rate. In this case, the control unit 81 may notify the mobile robot 1 of the pattern switching via interfaces 25 and 85 (to be discussed later). A plurality of pieces of visible recognition data may be selectively used, for instance, by using a recognition pattern for a long range, and a recognition pattern for a short range.

The charging station 80 may have an external construction recognizable as visible recognition data by imparting a pattern on the entire surface of the charging station 80 or an easily recognizable outline to the construction of the charging station 80. When the body of the charging station 80 and the display unit 82 are difficult to recognize at a distance, the display unit 82 may be placed at an elevated position, or may be equipped with a flag or a pilot lamp.

When there is no need for a change in the visible recognition data, the display unit 82 may be a print medium displaying a printed and fixed pattern (such as a cyber code). If the print medium is glued onto a flat surface, the visibility and recognition rate will be low from directions other than a direction normal to the flat surface. A plurality of print media may be glued onto a three-dimensional object such as a cylinder, a quadratic prism, or a sphere. With this arrangement, the visible recognition data is viewed from two or more directions. The mobile robot 1 can thus search for and approach the charging station 80 from a plurality of directions.

The display unit 82 may include an indicator such as an LED (Light-Emitting Diode) for indicating the conditions of the battery, such as "Now charging", "Charging complete", and "Abnormal charging". The user thus easily recognizes the battery condition referring to the LED indicator. The indicator may be mounted on the mobile robot 1, rather than on the charging station 80.

The transmitter 83 transmits at least one signal wave selected from among light ray, infrared light ray, sound wave, ultrasonic wave, radio wave, and magnetic field, giving to the mobile robot 1 a clue as to the range and bearing to the charging station 80. The transmitted signal preferably has a particular frequency pattern so that the mobile robot 1 may discriminate the signal from other signals created within the work space.

The mobile robot 1 searches for the source of the signal, namely, the position of the charging station 80, referencing the signal intensity of the signal detected by a receiver 28 (not shown in FIG. 2). The receiver 28 preferably has a good directivity and is capable of measuring a signal strength of the received wave.

Like the camera 15, the receiver 28 is preferably mounted on the head unit 3 of the mobile robot 1. For instance, the mobile robot 1 is equipped with at least two receivers 28, calculating the range and bearing to the charging station 80 through a stereo imaging method.

The head unit 3 may scan with the neck joint driven, thereby changing the direction of signal reception of the receiver 28. In this case, the mobile robot 1 advances (walks) in a direction in which the signal strength of the received signal is maximum. The mobile robot 1 thus detects a path to the charging station 80 having the source of the signal. If the receiver 28 is of a phased-array radar which detects both the range and bearing to the source of the signal, the signal strength and the direction are detected at the same time, eliminating the need for the scanning operation of the head unit 3.

When a path to the charging station 80 is complex because of the presence of obstacles within the work space, a plurality of media needs to be used in combination.

For instance, when the charging station 80 remains out of sight, a medium, such as a sound wave, having diffractive property, is used as a signal wave. With the charging station 80 appearing in sight of the mobile robot 1, the mobile robot 1 switches to the reception of light ray or to the searching using the camera 15.

The transmitter 83 may transmit the light ray through a slit, switching the slit pattern from direction to direction. With a single medium only, the mobile robot 1 searches for the charging station 80.

The transmitter 83 may transmit a plurality of signals to vary the positioning accuracy depending on the range. For instance, when a high-frequency signal of sound wave, ultrasonic wave, or electromagnetic wave is transmitted at a high intensity while a low-frequency signal being transmitted at a low intensity, an area where the high-frequency component only is received is considered to be relatively far from the charging station. When the mobile robot enters an area where a low-frequency component is received, the receiver detects that the mobile robot is closer to the charging station.

When communications are possible between the mobile robot 1 and the charging station 80 through a LAN (Local Area Network, such as Ethernet or BlueTooth) or other transmission medium, hand shake is established to exchange information about the change in the signal strength and the frequency of the signal depending on the distance therebetween.

When the mobile robot 1 searches for the charging station 80 and is docked at the charging station, the search operation needs to be performed depending on the distance therebetween, to prevent the mobile robot 1 from hitting the charging station 80, the terminals on the mobile robot 1 from hitting the terminals on the charging station 80, and the terminals from being damaged as a result of a hit. For instance, when both are spaced apart, the mobile robot 1 searches for the charging station 80 based on the image picked up by the camera 15 with the entire charging station 80 targeted. The mobile robot 1 thus quickly approaches the charging station 80. When the mobile robot 1 comes within a close range of the charging station 80, the target of the search is switched to a smaller object, such as a charging terminal, and the mobile robot 1 performs searching based on an output detected by a detector which provides a range measurement more accurate than the camera 15. For instance, more accurate range finding is performed based on the infrared light output or the time required for receiving a reflected ultrasonic wave.

The proximity and connection detector 84 detects that, as a result of the search operation by the mobile robot 1, the power supply control unit 86 is electrically connected to the charge/discharge controller 62 with the mobile robot 1 docked at the charging station 80. The proximity and connection detector 84 may be constructed of a micro-switch or a proximity sensor. The output provided by the proximity and connection detector 84 serves as a trigger for starting the power supplying by the power supply control unit 86.

The interface 85 establishes one-way connection or two-way connection with the interface 25 of the mobile robot 1, and complies with at least one of the interface protocols including RS-232C, IEEE1284, USB, i-Link, SCSI, and IrDA. The interfaces 85 and 25 are connected through wired or wireless communication link. It suffices to establish connection therebetween for a duration during which the proximity and connection detector 84 provides the output thereof.

The power supply control unit 86 controls power supplying for feeding power from the utility power supply to the mobile robot 1. The start time and stop time of the power feeding are triggered by the output signal of the proximity and connection detector 84.

The charge/discharge controller 62 generates charging current from the supplied power, charging the rechargeable battery 61. The charge/discharge controller 62 detects a fully charged state or charging complete state, based on the integrated power of charging current, the voltage across the terminals of the rechargeable battery 61, and the ambient temperature of the rechargeable battery 61. The charge/discharge controller 62 then notifies the control unit 20 of the charging complete state. The control unit 20 in turn may notify the charging station 80 of the charging complete time through the interfaces 25 and 85. During the normal operation during which the mobile robot 1 operates from the rechargeable battery 61 in a self-driven and self-controlled manner, the charge/discharge controller 62 constantly monitors a drop in the power remaining in the battery, by measuring the integrated quantity of supply current (i.e., a discharging current), the terminal voltage, and the ambient temperature of the battery. Upon detecting the time to start charging, the charge/discharge controller 62 notifies the control unit 20 thereof.

The electrical connection between the power supply control unit 86 and the charge/discharge controller 62 is not limited to any particular method. The electrical connection is typically established with electrical parts, such as connectors, having mechanical contacts, physically engaged with each other. Besides this method, non-contact power feeding through electromagnetic induction may be used. Specifically, each of the power supply control unit 86 and the charge/discharge controller 62 contains the induction coil thereof. When a current is flown through the coil in the power supply control unit 86 with the respective coils set to be close to each other, a charging current is generated in the coil in the charge/discharge controller 62 through electromagnetic induction.

The interface 87, for instance, a network interface card (NIC), is connected to an external system, such as a computer or a charging station, via a network (such as Ethernet or BlueTooth), to exchange messages. The charging station 80 is thus interconnected to the other charging stations through the network, thereby performing the charging operation in coordination with the other charging stations. The charging station 80 may be controlled by a host computer through the network so that the charging operation is remote-controlled.

The interface 87 is not limited to the NIC, and any type of interface is acceptable as long the interface provides an interface protocol compatible with the external system. For instance, the interface may comply with RS-232C, IEEE1284, USB, i-Link, SCSI, IrDA, etc.

Figure 5:
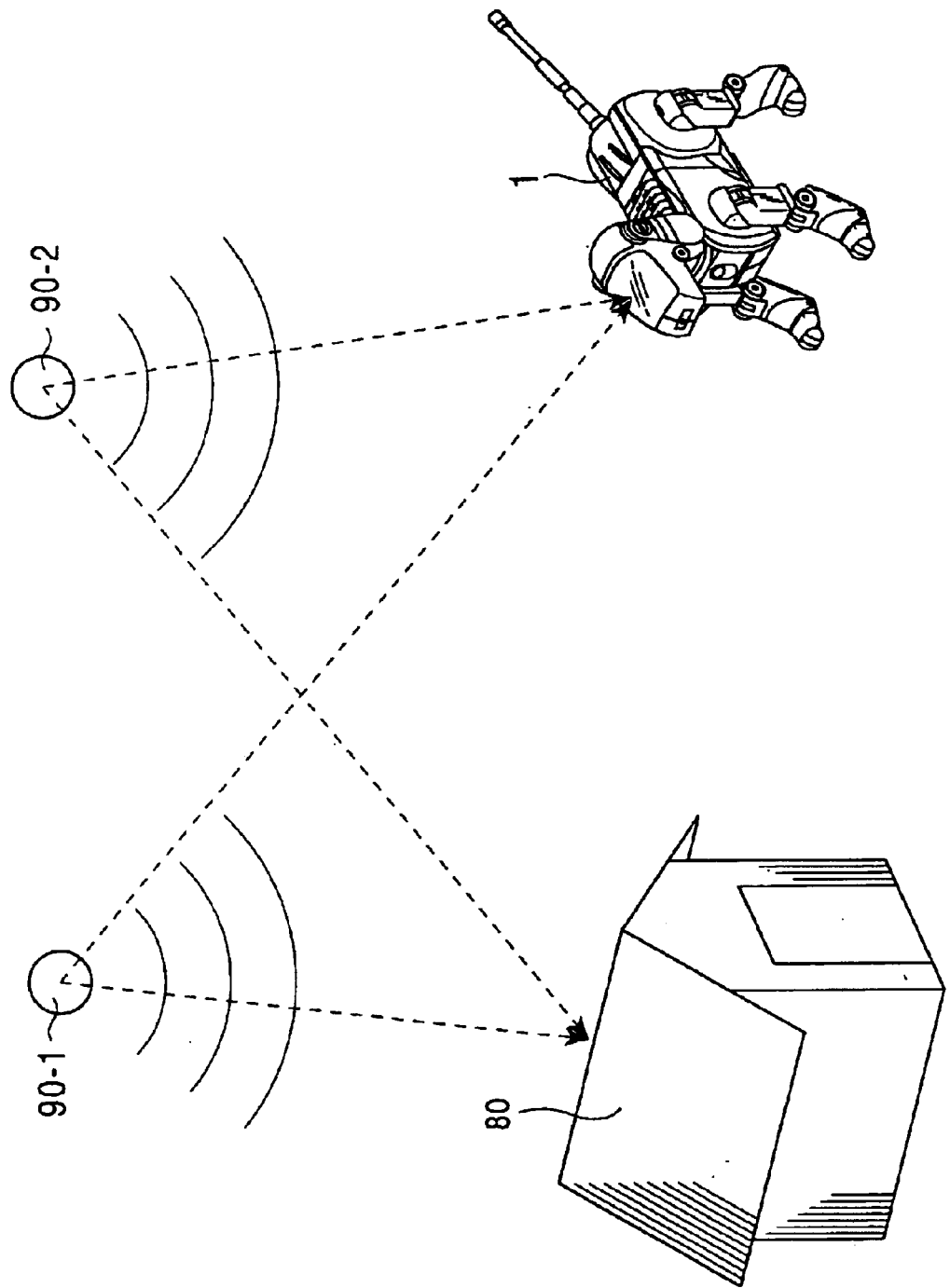
FIG. 5 diagrammatically shows a work space which accommodates the charging station 80, mobile robot 1, and external transmitter 90.

In the discussion with reference to FIG. 4, the transmitter 83 is arranged in the charging station 80 and is under the control of the control unit 81. The present invention is not limited this arrangement. For instance, an external transmitter 90 may be arranged within the work space at a place spaced from the power supply unit 60. FIG. 5 shows the work space within which the charging station 80, the mobile robot 1, and the external transmitter 90 are arranged.

In this case, at least one external transmitter 90-1 is installed in the work space. These external transmitters 90-1, . . . , are installed at respective fixed locations within the work space, and a reference point or reference coordinates system is defined for the searching for the charging station 80.

The mobile robot 1 calculates the range and bearing to each of the external transmitters 90-1, . . . , and determines the position thereof with respect to each of the external transmitters 90-1, . . . The mobile robot 1 thus derives the path to the charging station 80.

It is not a requirement that the external transmitters 90-1, ... be installed within the work space of the charging station 80 and the mobile robot 1. For instance, satellites of the GPS (Global Positioning system), and earth control stations thereof may be used as the external transmitter 90.

The system shown in FIG. 5 is realized on the assumption that the mobile robot 1 holds the position data of the charging station 80. The method of position determination of the charging station 80 is not particularly limited, but the following three methods are available.

Method 1

The charging station 80, with the mobile robot 1 docked at the charging station 80, calculates and stores the range and bearing of own position to the external transmitter 90-1. The charging station 80 thus teaches the mobile robot 1 the present position. The mobile robot 1 searches for the charging station 80, based on the relative positional relationship between own position at the time to start charging and the stored position of the charging station 80.

Method 2

The position of the charging station 80, relative to the external transmitter 90-1 as a reference point, is determined and is beforehand stored in the memory of the mobile robot 1. At the time to start charging, the mobile robot 1 reads the position information of the charging station 80, and searches for the charging station 80, based on the relative positional relationship of the calculated position to the read position.

Method 3

The function of calculating the range and bearing to the external transmitter 90-1 is provided to the charging station 80. At the time to start charging, the position information calculated by the charging station 80 is transferred to the mobile robot 1 through wireless communication by radio wave or infrared light. The mobile robot 1 searches for the charging station 80, based on the relative position relationship to the reported position information.

In the embodiment discussed with reference to FIG. 2 through FIG. 4, the mobile robot 1 searches for the charging station 80 based on the image picked up by the camera 15 thereof. The present invention is not limited to this arrangement. The charging station 80 may be equipped with a camera to monitor the mobile robot 1 now walking.

In such a case, the mobile robot 1 needs recognition data (for instance, visual marks such as cyber code) formed onto the surface of the body thereof and easy to be recognized by the camera on the charging station 80.

The charging station 80 calculates the range and bearing to the mobile robot 1 based on the image of the mobile robot 1, and notifies the mobile robot 1 of the calculated range and bearing through hand shaking. The hand shaking with the mobile robot 1 may be performed through wireless communication through radio wave connection or IrDA connection.

Figure 6:
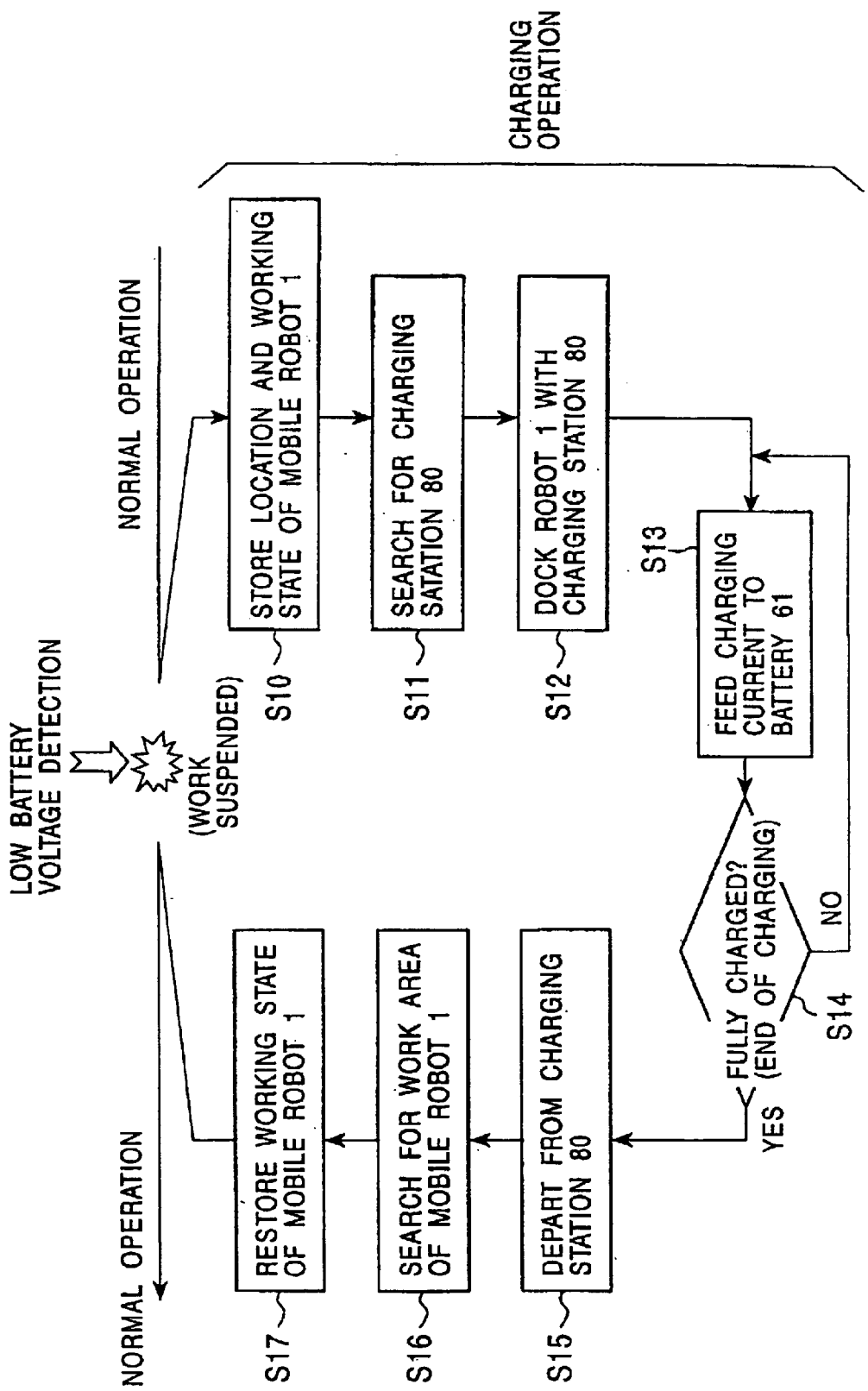
FIG. 6 is a flow diagram showing the process of a charging operation performed by the mobile robot 1 of the present invention.

FIG. 6 is a flow diagram illustrating a charging operation process executed by the mobile robot 1 of this embodiment. The charging operation is now discussed, referring to FIG. 6.

The mobile robot 1 is now battery-driven in normal operation.

The normal operation refers to the operation in which the mobile robot 1 takes a variety of actions and reactions in accordance with the time-series model stored in the non-volatile memory 24 in response to the outputs from the sensors including the camera 15, microphone 16, and touch sensor 18.

Upon detecting a low battery voltage state of the power remaining in the rechargeable battery 61 during the normal operation, the charge/discharge controller 62 notifies the control unit 20 of the low battery voltage state.

The CPU 21 in the control unit 20 suspends the normal operation in response to the notification of the low battery voltage state, and starts a charging operation with the normal operation interrupted.

In the charging operation, the mobile robot 1 searches for the charging station 80 (step S11). The searching operation is performed in accordance with a predetermined path searching algorithm, based on the radio wave, sound wave, ultrasonic wave, and light ray transmitted from the charging station 80 (as already discussed). To smoothly resume the normal operation later, the work status and the position of the mobile robot 1 immediately prior to the suspension of the normal operation are preferably stored before going to search for the charging station 80 (step S10).

When the mobile robot 1 arrives at the charging station 80 as a result of the searching operation, the mobile robot 1 is then docked at the charging station 80 (step S12). The docking operation includes a step for mating the power feeding electrodes or connectors between the mobile robot 1 and the charging station 80. When non-contact power feeding is performed using electromagnetic induction, the induction coils are placed close to each other, rather than being directly connected to each other. During the docking operation, the control unit 20 in the mobile robot 1 may hand-shake with the control unit 81 in the charging station 80 via the interfaces 25 and 85. The signal detected by the proximity and connection detector 84 is used to determine whether the docking operation has been completed. The mating method between the connectors will be discussed in detail later.

When the charging is ready with the docking operation completed in step S12, the power supply control unit 86 starts feeding power to the charge/discharge controller 62. The charge/discharge controller 62 converts the supplied power to a charging current appropriate in level for the charging characteristics of the rechargeable battery 61, and feeds the rechargeable battery 61 with the power (step S13).

During the charging operation, the charge/discharge controller 62 constantly monitors the charging state of the rechargeable battery 61, by measuring the terminal voltage across the rechargeable battery 61, the integrated power of the charging current, and the ambient temperature of the battery. Upon detecting the fully charged state or the charging complete state of the rechargeable battery 61, the charge/discharge controller 62 notifies the control unit 20 of the fully charged state (step S14).

In response to the notification of the charging complete state, the control unit 20 undocks or disengages the mobile robot lout of the charging station 80 (step S15). During the undocking operation, the control unit 20 communicates with the control unit 81 of the charging station 80 for hand shaking through the interfaces 25 and 85.

When undocked from the charging station 80, the mobile robot 1 searches for the site of the suspension of the normal operation (step S16). When the mobile robot 1 returns to the site, the mobile robot 1 restores the state immediately prior to the suspension of the normal operation, thereby resuming the normal operation (step S17).

The electrical connection mechanism between the mobile robot 1 and the charging station 80 is now discussed.

Figure 7:
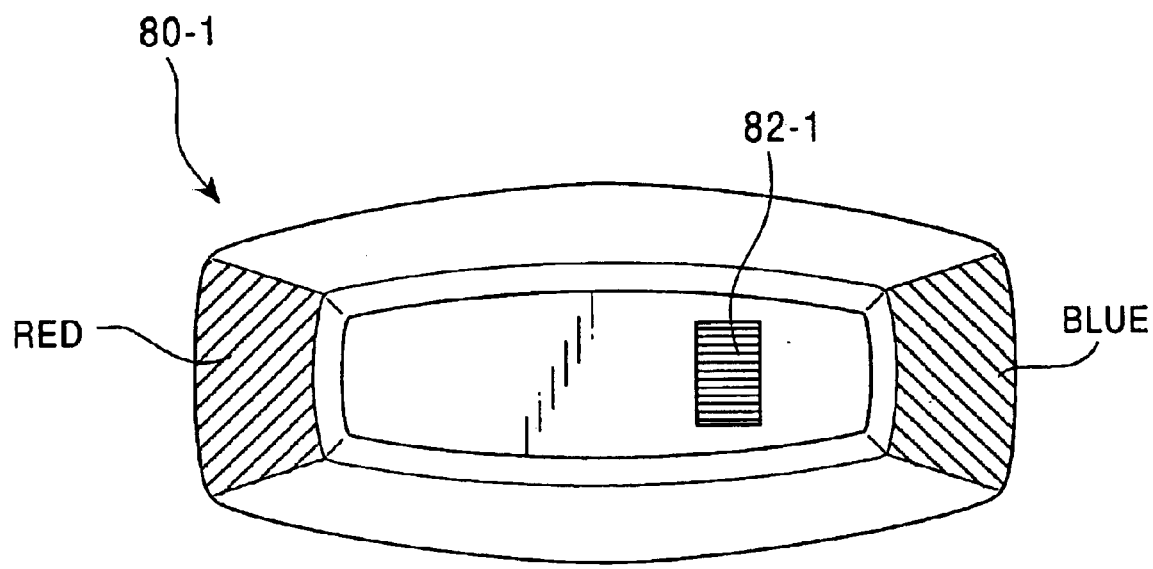
FIG. 7 is a top view of the charging station 80-1 of a first embodiment of the present invention.
Figure 8:
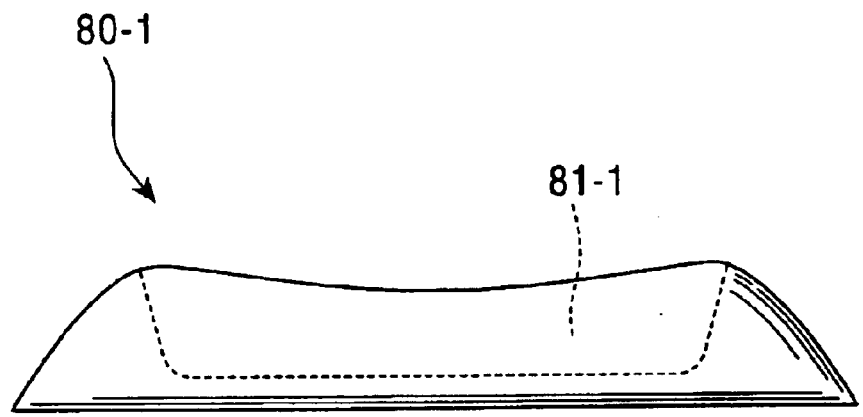
FIG. 8 is a sectional view of the charging station 80-1 of the first embodiment of the present invention.
Figure 9:
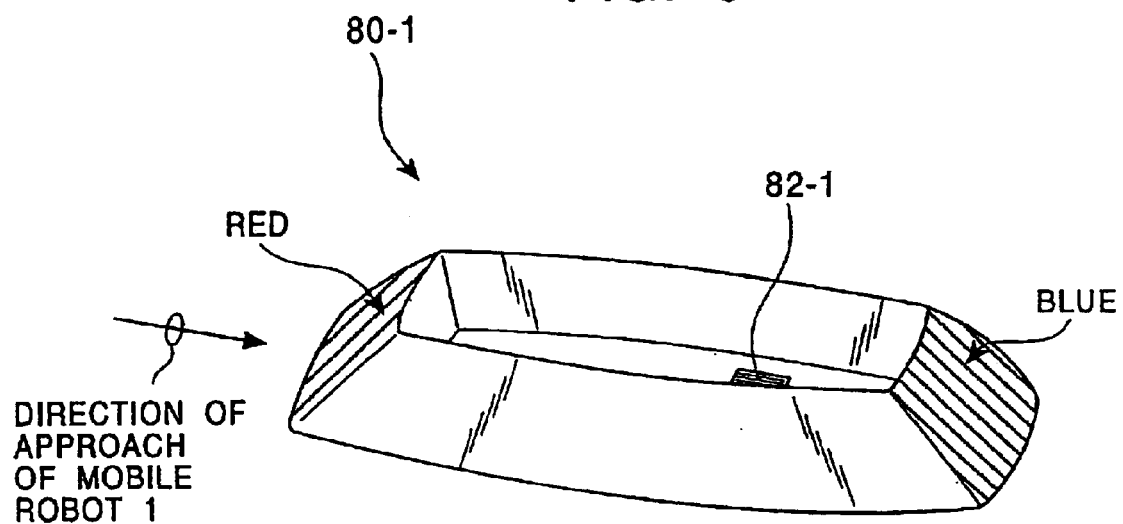
FIG. 9 is a perspective view of the charging station 80-1 of the first embodiment of the present invention.

FIG. 7 through FIG. 9 show the external appearance of a charging station 80-1 of a first embodiment of the present invention. As shown, the charging station 80-1 has an elongated round box configuration, modeling the bed for the dog. The charging station 80-1 includes a concaved receptacle 81-1 which receives on the central portion thereof a dog-like mobile robot 1.

The receptacle 81-1 is shaped and sized to receive the bottom portion of the torso unit 2 of the mobile robot 1 shown in FIG. 1. The receptacle 81-1 has, on the inner bottom thereof, electrical contact points (connector) 82-1 for establishing the electrical connection with the torso unit 2.

The charging station 80-1 has, on the front end wall and rear end wall thereof, red and blue color patterns.

The mobile robot 1 detects the presence of the mobile robot 1 response to he red and blue color patterns within sight thereof (in an image acquired by the camera 15). The distance between the charging station 80-1 and the mobile robot 1 is calculated, based on the layout of the color patterns.

The mobile robot 1 walks toward the charging station 80-1 in an optimum path that is aligned with a line that connects the red and blue color patterns in that order within sight. Finally, the mobile robot 1 approaches, straddling over the charging station 80-1.

When the two color patterns are out of sight in a close range to the charging station 80-1, the mobile robot 1 stops walking at a predetermined timing. The mobile robot 1 lies down, placing the underside (abdomen) of the torso unit 2 lying on the receptacle 81-1. The mobile robot 1 thus establishes the electrical connection to the charging station 80-1 via the connector 82-1 in the charging position.

The connector (not shown) of the mobile robot 1 is arranged on the underside (abdomen) of the torso unit 2 in the position facing the connector 82-1. Since the weight of the mobile robot 1 acts on the connector thereof in the charging position of the mobile robot 1, the mobile robot 1 maintains the electrical connection with the connector 82-1 without the need for any particular mechanical engagement means.

When the red and blue color patterns are merged into the environment, different color patterns having higher recognition rate may be employed. Instead of the color pattern, a visual mark, such as the cyber code, having high visibility and high recognition rate, may be employed.

Figure 10:
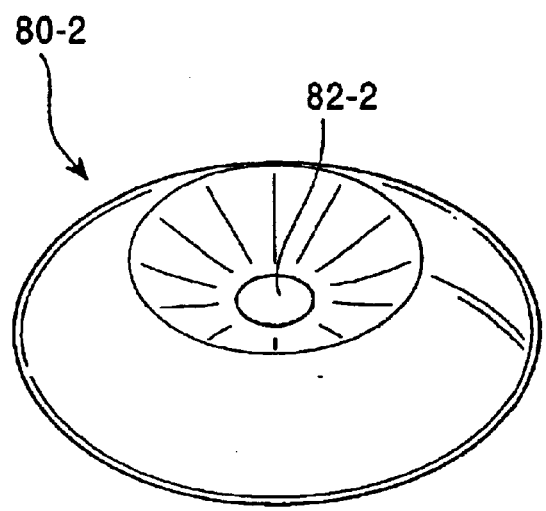
FIG. 10 is a perspective view of the charging station 80-2 of a second embodiment of the present invention.
Figure 11:
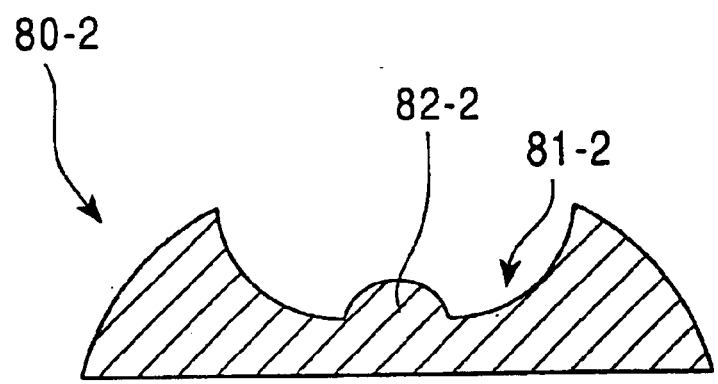
FIG. 11 is a sectional view of the charging station 80-2 of the second embodiment of the present invention.

Referring to FIG. 10 and FIG. 11, there is shown a charging station 80-2 of a second embodiment of the present invention. As shown, the charging station 80-2 has a bowl-shaped structure. The charging station 80-2 has the bowl-shaped concave thereof serving as a receptacle 81-2 and a generally semi-spherical projection 82-2 on the generally central position of the bowl-shaped concave. The charging station 80-2 receives the mobile robot 1 with its sitting position.

The projection 82-2 serves as an electrical contact, as will be discussed later. The concave 81-2 and the projection 82-2 are preferably formed to be rotationally symmetric with respect to the axis aligned with the direction of depth of the concave.

Figure 12:
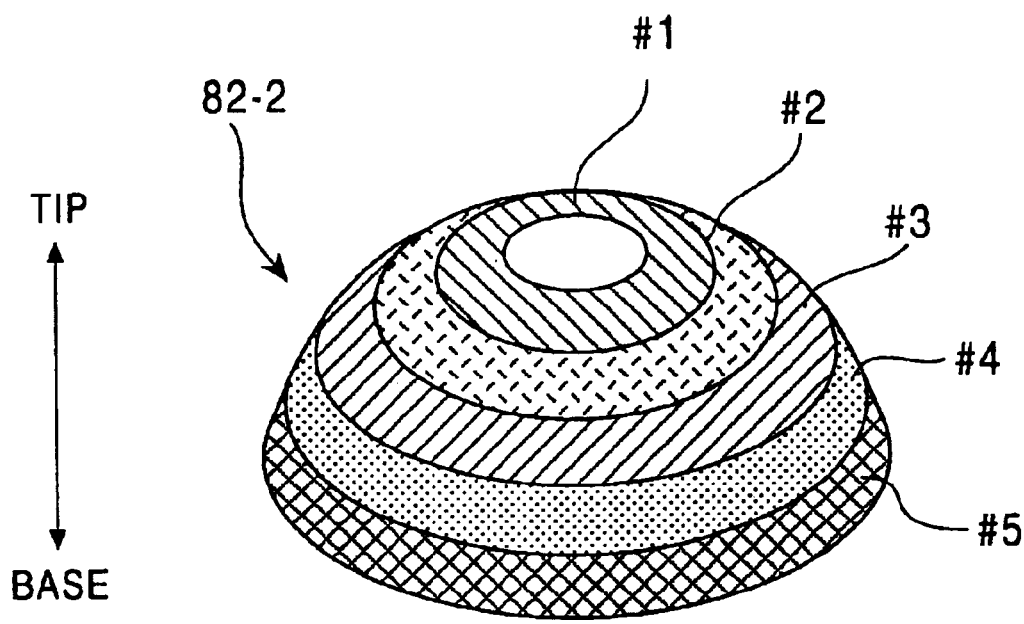
FIG. 12 is an enlarged perspective view of an electrical contact 82-2 in the charging station 80-2 of the second embodiment of the present invention.

FIG. 12 is an enlarged perspective view of the projection 82-2. As shown, the projection 82-2 is cut into at least a tip thereof and one frustohemispherical slice, each serving as a connection terminal. For instance, the tip of the projection 82-2 serves as a signal line, and the frustohemispherical terminal serves as a power line. In this way, an erratic connection between connectors of different polarity is duly prevented when the connectors are mated or unmated.

Since both the receptacle 81-2 and the connector 82-2 are rotationally symmetric, the mobile robot 1 can make access to the charging station 80 from any direction within a range of 180 degrees.

The receptacle 81-1 has the bowl-shaped inner wall with its curved slope. Even when the mobile robot 1 does not straddle the charging station 80-2 in a correct position, the mobile robot 1 becomes correctly aligned with the connector 82-2 as the mobile robot 1 sits down into the charging station 80-2 along the slope of the bowl. The weight of the mobile robot 1 assures the electrical connection with the projection 82-2.

Figure 13:
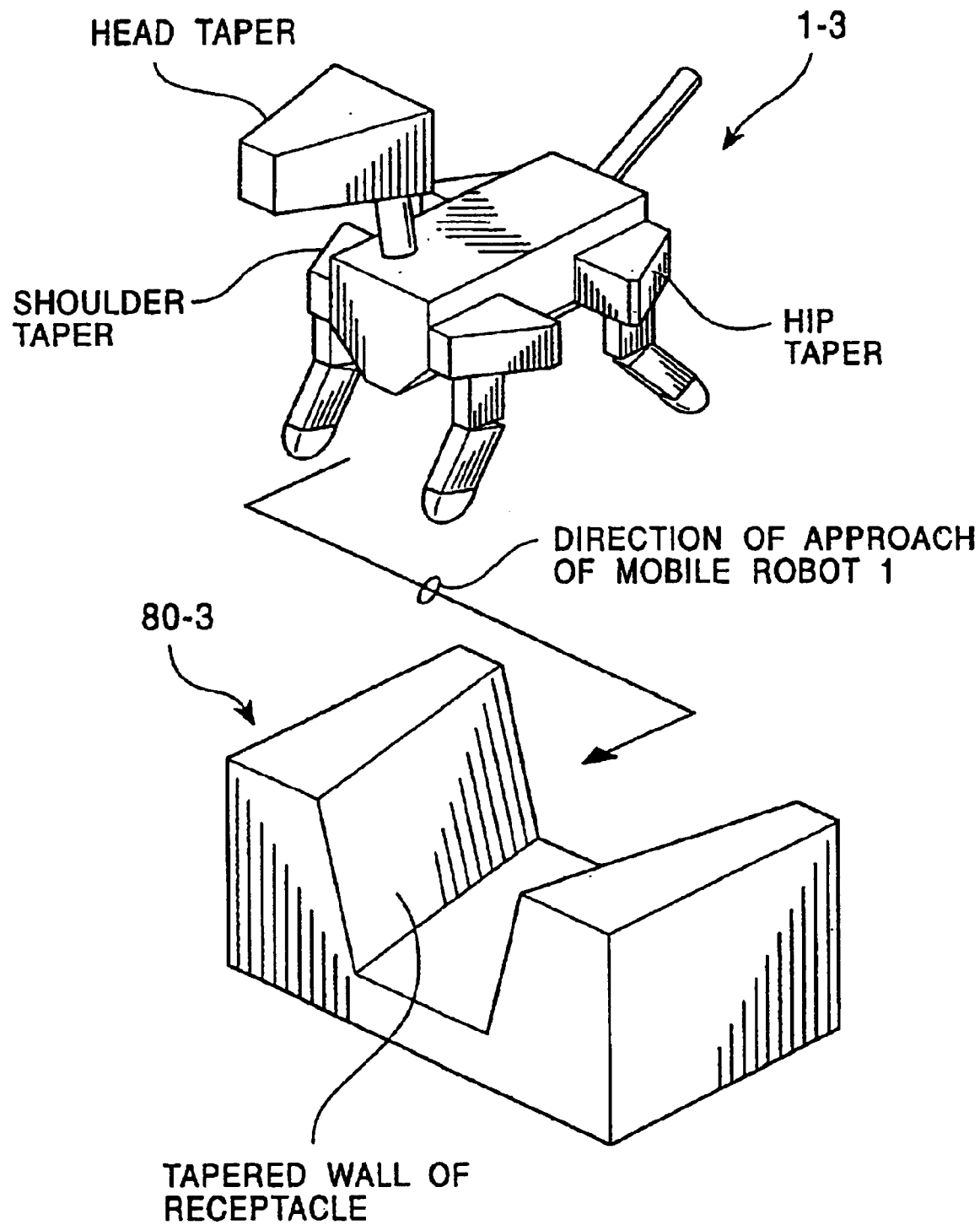
FIG. 13 is an external view of a mobile robot 1-3 and a charging station 80-3 in accordance with a third embodiment of the present invention.

FIG. 13 shows the external appearances of a mobile robot 1-3 and a charging station 80-3 in accordance with a third embodiment of the present invention.

As shown, the mobile robot 1-3 includes a tapered head unit 2-3, tapered shoulders, and tapered hips. The charging station 80-3 has an entrance opening wide enough to receive the tapered portions of the mobile robot 1-3. The charging station 80-3 has inner walls tapered at an angle to match the respective tapered portions of the mobile robot 1-3. The charging station 80-3 has, on the front face thereof, a color pattern or a visual mark (not shown), such as a cyber code, which is recognized by the camera 15 of the mobile robot 1-3.

Upon recognizing the visual mark through the camera 15, the mobile robot 1-3 starts tracking it and reaches the entrance of the charging station 80-3. As the mobile robot 1-3 further moves into through the entrance, the mobile robot 1-3 is guided along the tapered inner walls of the gradually narrowing opening. The mobile robot 1-3 finally reaches the deepest inside position of the charging station 80-3 where the electrical connection is established in a correct position. The mobile robot 1-3 is thus guided to the correct connection position after being slid along the tapered inner walls of the charging station 80-3, without any particular alignment step.

Figure 14:
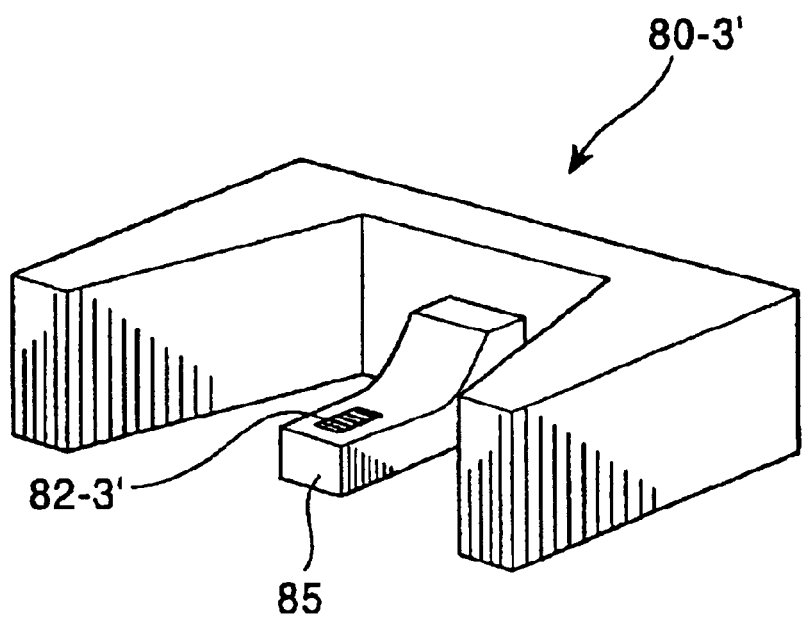
FIG. 14 shows the construction of an electrical connection in the charging station 80-3 of the third embodiment of the present invention.

FIG. 14 illustrates the electrical connection of the charging station 80-3'. As shown, the charging station 80-3 has a generally U-shaped structure, which has tapered inner walls that receive the tapered portions of the mobile robot 1-3. A lip 85, extending from the inner bottom surface of the U-shaped structure, has, on the top surface thereof, a connector 82-3.

Figure 15:
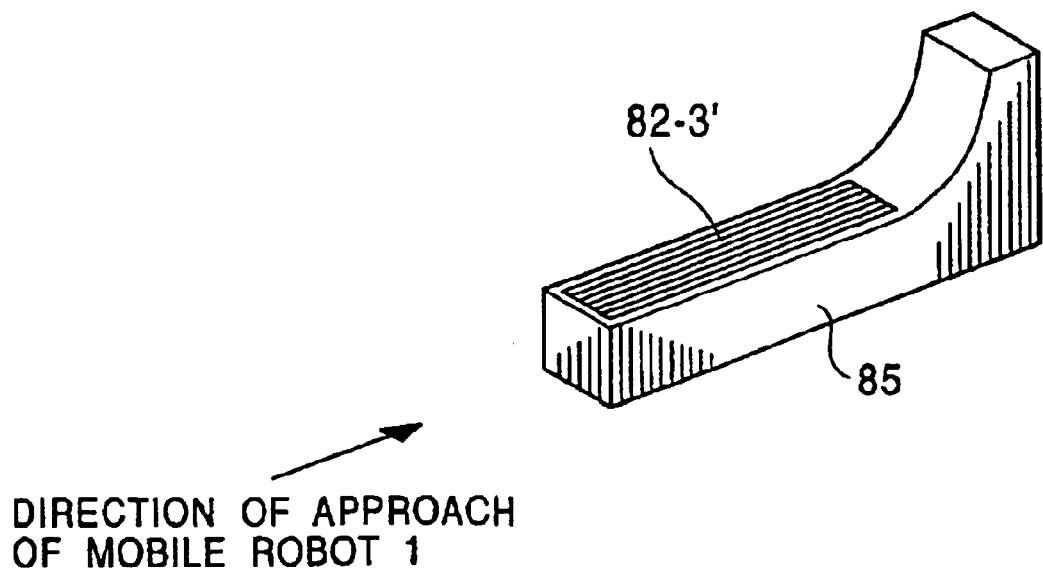
FIG. 15 is an enlarged view showing only the electrical connection of the charging station 80-3.

FIG. 15 is an enlarged view of the electrical connection of the charging station 80-3'. Since the terminals of the connector 82-3' extend in the direction of insertion as shown, a less severe positioning accuracy requirement of the mobile robot 1-3 in the stop position thereof is acceptable.

Figure 16:
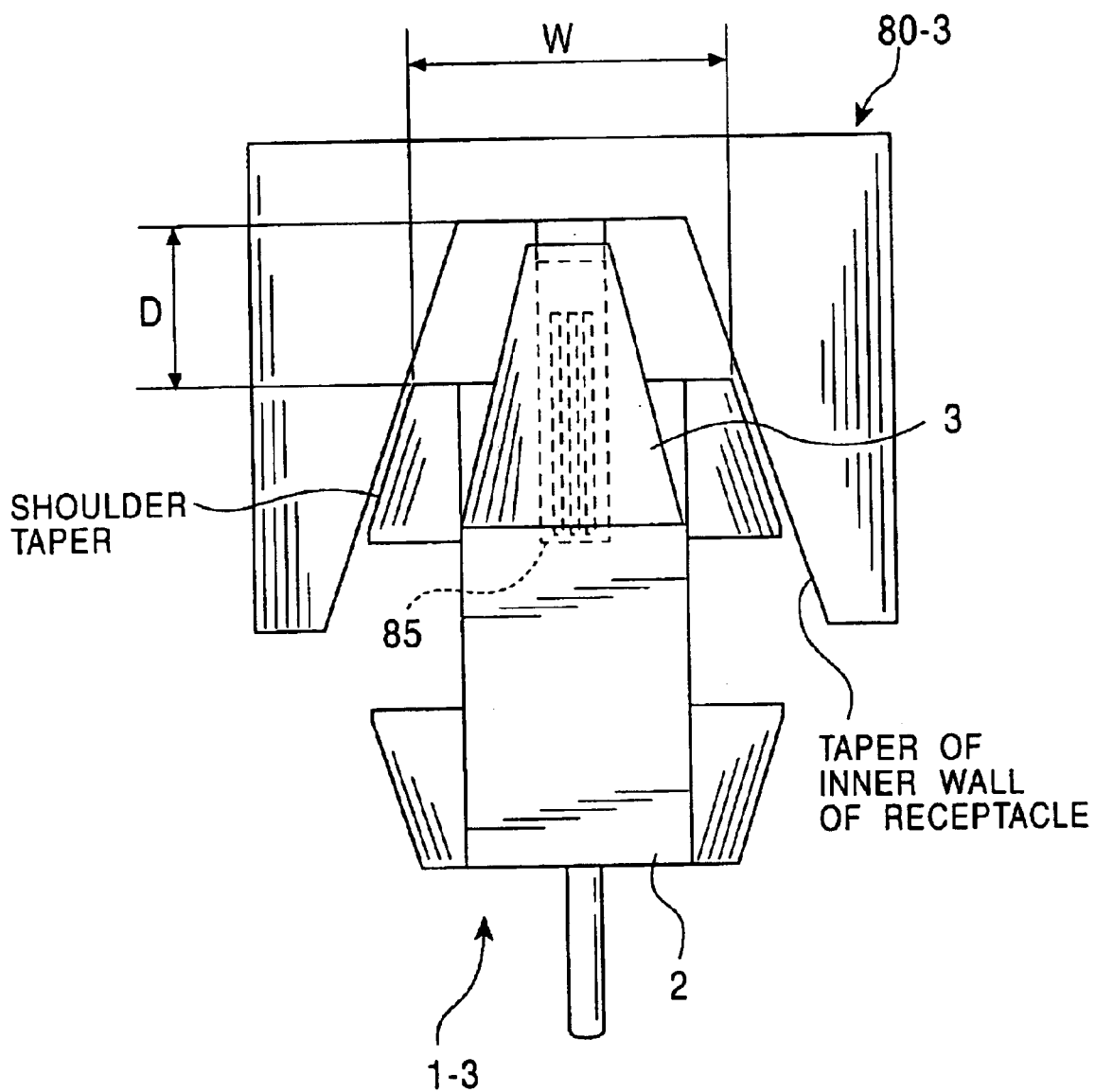
FIG. 16 is a top view of a mobile robot 1-3 placed into the charging station 80-3.

FIG. 16 shows the mobile robot 1-3 docked in the charging station 80-3. As shown, the mobile robot 1-3 is inwardly deeply guided with the tapered shoulders of the mobile robot 1-3 sliding along the tapered walls of the charging station 80-3.

The deepest inside position D to which the mobile robot 1-3 is inserted is determined by the width W across the shoulders of the mobile robot 1-3. Using a long lip 85, the electrical connection is established before the front end of the head unit 3 impacts the bottom wall of the charging station 80-3.

When the mobile robot 1-3 lies down with the front feet straddling the lip 85, the electrical connection is established between the mobile robot 1-3 and the charging station 80-3. The weight of the mobile robot 1-3 maintains a stable contact state.

Ne electrical contact may be formed between the connectors, even when the mobile robot 1-3 is docked at the charging station 80-3 along the tapered inner walls thereof. In such a case, the mobile robot 1-3 may be undocked and spaced by some distance from the charging station 80-3, and may be docked into the charging station 80-3 again.

Figure 17:
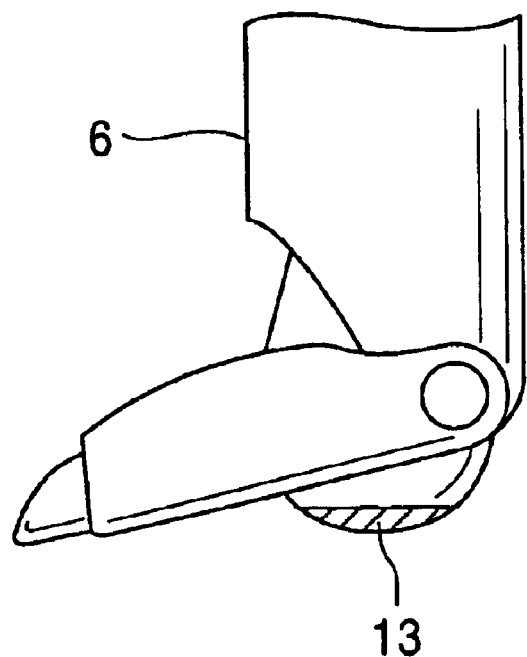
FIG. 17 is a side view of the mechanism of an electrical connection, namely, a foot unit 6 with a connection terminal arranged on the tip thereof.
Figure 18:
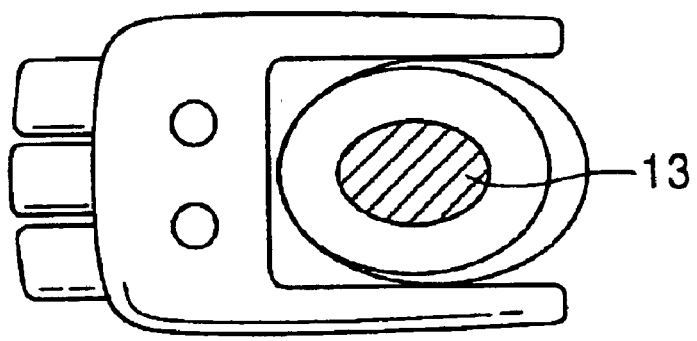
FIG. 18 is a bottom view of the mechanism of an electrical connection, namely, a foot unit 6 with a connection terminal arranged on the tip thereof.

FIG. 17 and FIG. 18 illustrates an electrical connection mechanism of a fourth embodiment of the present invention.

Referring to FIG. 17, an electrode terminal is arranged on the end of a movable portion, such as the sole, of each of the front feet 6A and 6B and hind feet 6C and 6D of the mobile robot 1. The movable portion is not limited to the foot, and may be the hand, the tail or the head.

The mobile robot 1 is put into contact with the electrode terminal of the charging station 80 by moving the foot. By a stamping action, the weight of the mobile robot 1 acts on the contact of the electrode terminal, maintaining a reliable contact state.

To charge the battery, at least two electrodes of positive and negative are required. The positive and negative electrodes are thus assigned the movable portions, such as the front left foot and front right foot or the hind left foot and hind right foot.

When there are three or more movable portions, two of the three may be used for the positive and negative terminals. As a combination of electrode terminals, a movable portion such as the tail and a non-movable portion such as the torso unit 2 may be combined.

Figure 19:
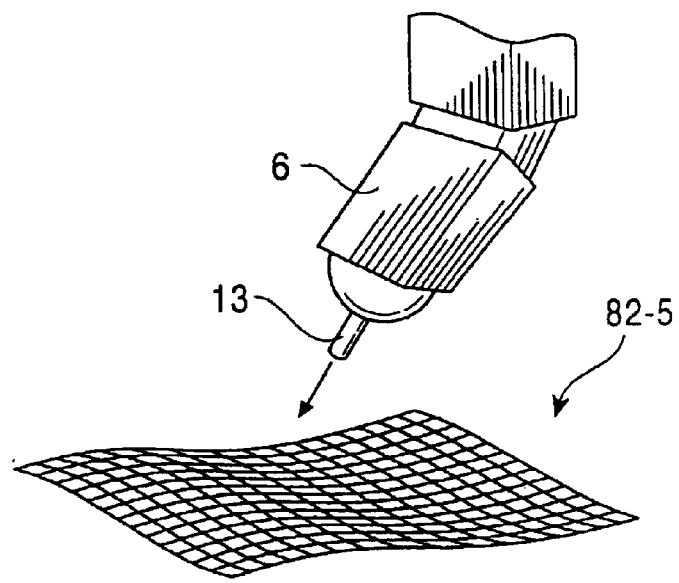
FIG. 19 shows the mechanism of an electrical connection of in accordance with a fifth embodiment of the present invention.
Figure 20:
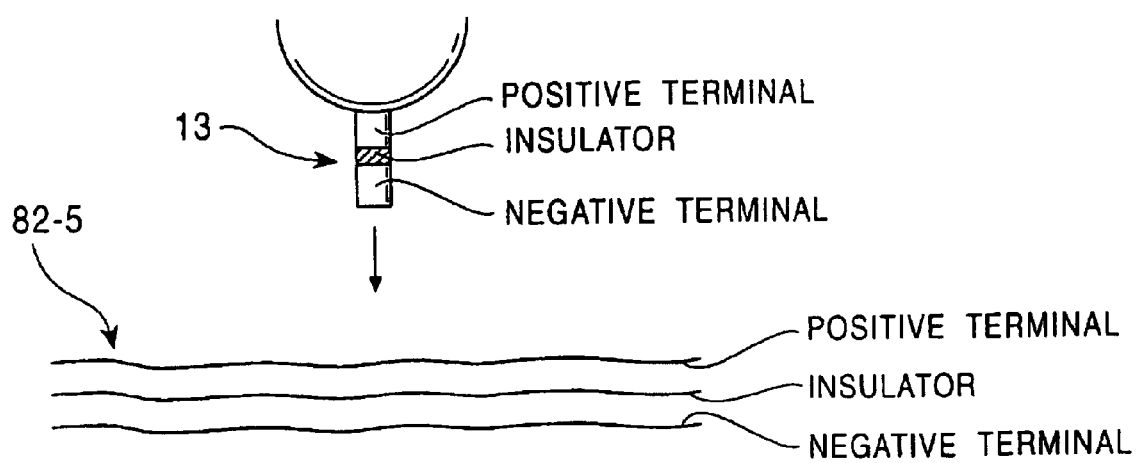
FIG. 20 shows the mechanism of the electrical connection of in accordance with the fifth embodiment of the present invention.

FIG. 19 and FIG. 20 illustrate an electrical connection mechanism of a fifth-embodiment of the present invention.

A connector of the mobile robot 1 is an elongated probe as shown in FIG. 19, and is attached to the end of the movable portion of the hand, leg, tail, for instance.

An electrical interconnection portion 82-5 of the charging station 80 is constructed of an electrically conductive mesh as shown in FIG. 19. When the mobile robot 1 approaches the charging station 80, and inserts the probe into the mesh 82-5 at any position, the electrical connection is established. In other words, no severe accuracy is required for the electrical connection in the alignment of the mobile robot 1.

One single probe electrode may be arranged on each of at least two movable portions, such as left hand and right hand, or right foot and left foot. Referring to FIG. 20, a plurality of terminals may be arranged along the length of the probe. In this case, the mesh 82-5 has a multi-layered structure.

The probe terminal may be arranged to be retractable into the end portion of the foot so that the probe may be protected from any damage arising from an external undue force while the probe is not used (i.e., during the operation period other than the charging operation time).

Figure 21:
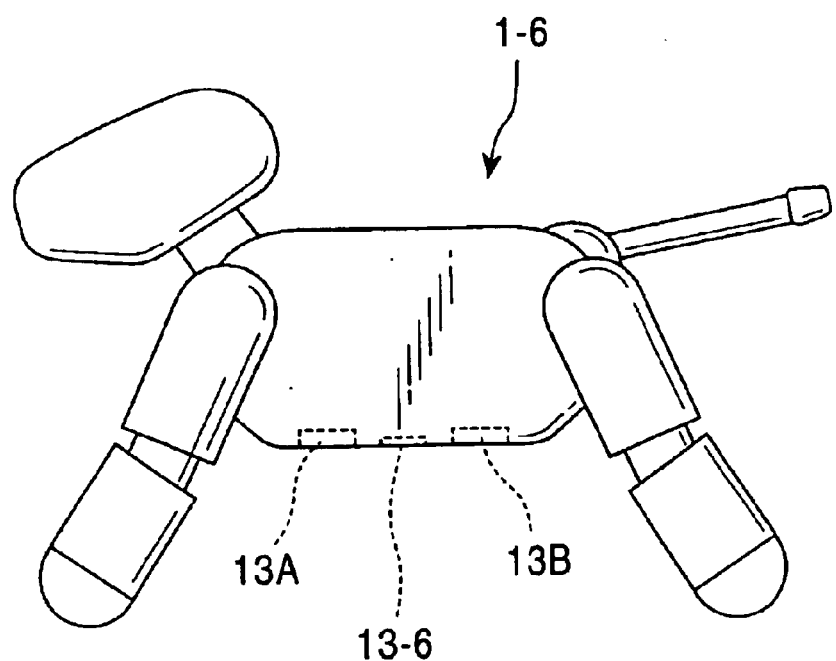
FIG. 21 is a side view of a mobile robot 1-6 of a sixth embodiment of the present invention.
Figure 22:
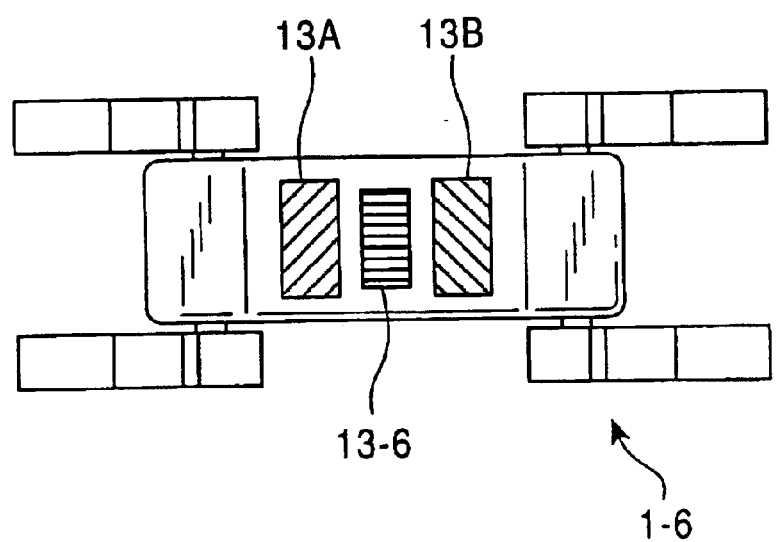
FIG. 22 is a bottom view of the mobile robot 1-6 of the sixth embodiment of the present invention.
Figure 23:
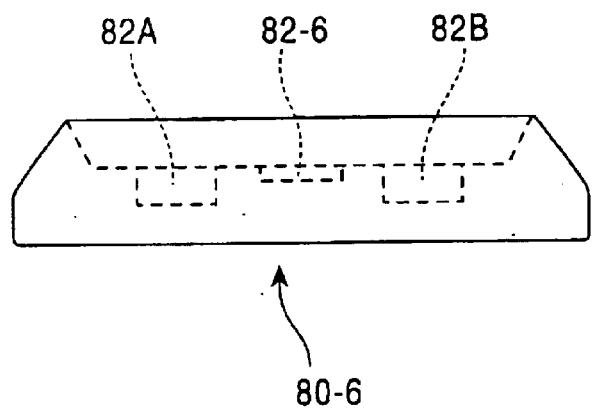
FIG. 23 is a side view of a charging station 80-6 of a sixth embodiment with the internal construction thereof revealed.

FIG. 21 through FIG. 23 illustrate a mobile robot 1-6 and a charging station 80-6 in accordance with a sixth embodiment of the present invention.

Referring to FIG. 21 and FIG. 22, the mobile robot 1-6 of the sixth embodiment has a connector 13-6 on the underside, i.e., the abdomen, of the torso unit 2. In the same way as in the first m embodiment shown in FIG. 7, a box-like charging station 80-6 receives the toy robot modeling the dog.

Referring to FIG. 21 and FIG. 22, a pair of electromagnets 13A and 13B are arranged on both sides of the connector 13-6. The charging station 80-6 also has, on the inner bottom surface thereof, a pair of electromagnets 82A and 82B on both sides of a connector 82-6.

When the mobile robot 1-6 approaches the charging station 80-6 with the connectors 13-6 and 82-6 in a close enough range, a current is flown through each of the electromagnets causing magnetic field so that the electromagnet 13A attracts the electromagnet 82A while the electromagnet 13B attracts the electromagnet 82B. A mechanically and electrically sound contact condition is thus maintained between the connectors 13-6 and 82-6.

Upon completion of the charging, the current is switched to cause magnetic fields so that both the electromagnets 13A and 82A repel each other and the electromagnets 13B and 82B repel each other. In this way, the mobile robot 1-6 is forced to quickly undock from the charging station 80-6.

In the docking operation of the mobile robot 1-6 with the charging station 80-6, the correct mating alignment of the connectors is assured, not only by imparting opposite polarities to the electromagnets 13A and 82A for attraction, but by imparting the same polarity to the electromagnets 13A and 82B (also to the electromagnets 13B and 82A) for repellency.

The number of the electromagnets for keeping the mobile robot 1-6 docked at the charging station 80-6 is not important. The number of the electromagnets may be one, or may be three or more.

Figure 24:
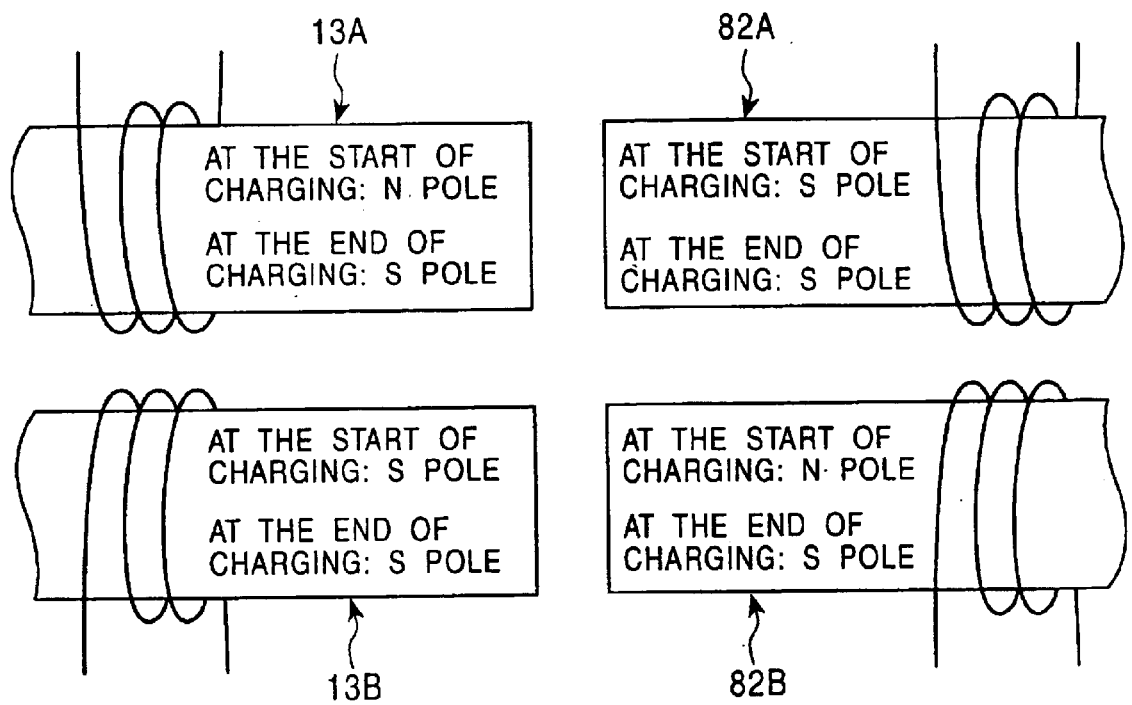
FIG. 24 shows a modification of the charging station 80-6 of the sixth embodiment.

FIG. 24 shows a modification of the sixth embodiment of the present invention. In the sixth embodiment, the electromagnets are arranged beside the connectors 13 and 82. In this modification, the function of the electromagnet is transferred to the electrode terminal of the connector itself.

To start charging, the directions of the currents flowing through the electromagnets are set so that the positive terminal 13A of the mobile robot 1-6 and the positive terminal 82A of the charging station 80-6 are respectively N pole and S pole (or S pole and N pole) for attraction. Similarly, the directions of the currents flowing through the electromagnets are set so that the negative terminal 13B of the mobile robot 1-6 and the negative terminal 82B of the charging station 80-6 are respectively S pole and N pole (or N pole and S pole) for attraction.

The correct mating alignment of the connectors is assured by magnetizing to the same polarity the positive terminal 13A of the mobile robot 1-6 and the negative terminal 82B of the charging station 80-6 (similarly magnetizing to the same polarity the negative terminal 13B of the mobile robot 1-6 and the positive terminal 82A of the charging station 80-6). The erratic connection of the positive terminal 13A of the mobile robot 1-6 to the negative terminal 82B of the charging station 80-6 is thus avoided.

When the charging operation is complete, the directions of the currents flowing through the respective electromagnets are switched so that the positive terminal 13A of the mobile robot 1-6 and the positive terminal 82A of the charging station 80-6 are magnetized to the same polarity, and the negative terminal 13B of the mobile robot 1-6 and the negative terminal 82B of the charging station 80-6 are magnetized to the same polarity. The same polarity terminals are thus repelled from each other. As a result, the mobile robot 1-6 is forced to quickly undock from the charging'station 80-6.

Figure 25:
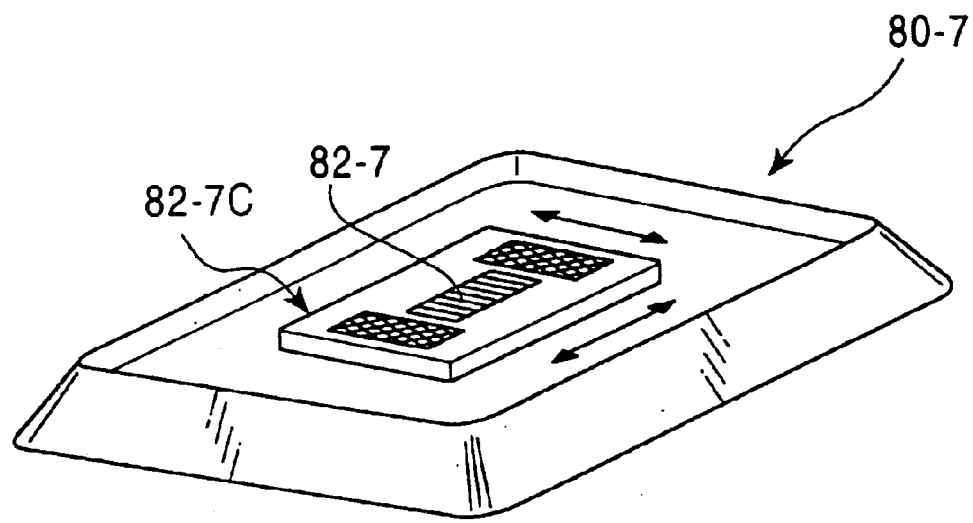
FIG. 25 shows a charging station 80-7 of a seventh embodiment of the present invention.
Figure 26:
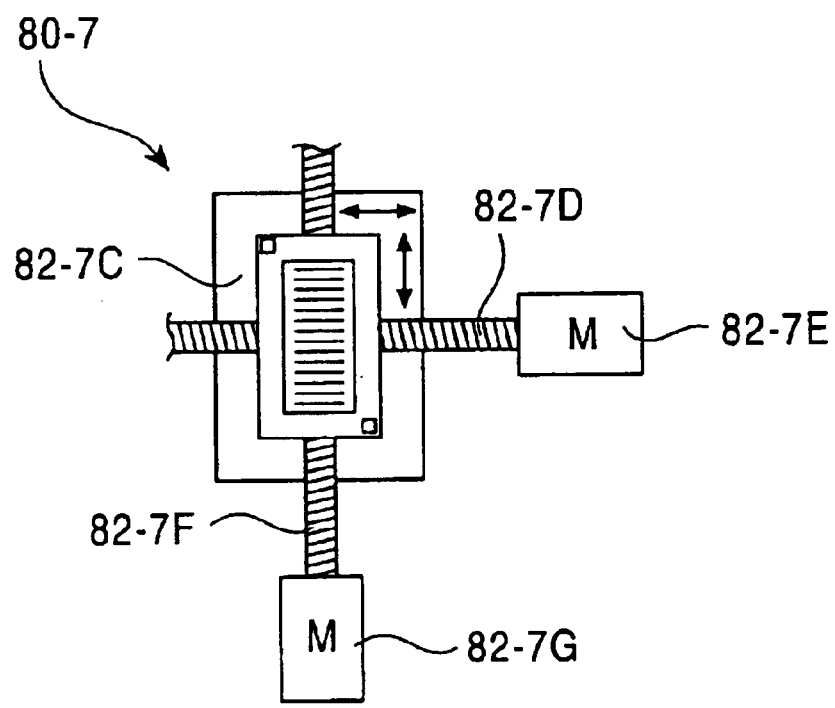
FIG. 26 shows the charging station 80-7 of the seventh embodiment of the present invention.

FIG. 25 and FIG. 26 illustrate a charging station 80-7 of a seventh embodiment of the present invention.

Like the charging station 80-1 of the first embodiment, the charging station 80-7 is a box-like charging station that models the bed of the dog-type mobile robot 1. The seventh embodiment is different from the first embodiment in that a connector 82-7 for electrical connection with the mobile robot 1 is mounted on a drive table 82-7C movable in the X and Y axes.

Referring to FIG. 26, the drive table 82-7C is moved in the x axis along a ball screw 82-7D when an actuator 82-7E is driven. Similarly, by driving an actuator 82-7G, the drive table 82-7C is moved in the Y axis along a ball screw 82-7F.

Although not shown in FIG. 25 and FIG. 26, a color sensor or an infrared light sensor for recognizing the connector 13 of the mobile robot 1 may be arranged in the vicinity of the connector 82-7 of the charging station 80-7. The recognition data, such as the color and pattern, recognizable from the charging station 80, may be arranged in the vicinity of the connector 13 of the mobile robot 1, or a signal wave may be transmitted. The above combination may be reversed, i.e., the color sensor may be arranged on the mobile robot 1 and the color pattern may be arranged on the charging station 80-7.

When the mobile robot 1 approaches the charging station 80-7, and comes within a predetermined distance or range of the connector 82-7, the charging station 80-7 drives the connector 82-7 in each of the X and Y axes to search for a connection position with the connector 13 of the mobile robot 1 for precise alignment.

In the seventh embodiment, the accuracy requirement of the alignment mechanism of the mobile robot 1 is not so severe. As the specification and accuracy of the mobile robot 1 are not so rigorous, the weight and manufacturing cost of the mobile robot 1 are accordingly reduced.

Electromagnets may be arranged in the vicinity of the connectors, or the connector terminals themselves may be fabricated of electromagnets. The directions of currents flowing through the electromagnets are set to cause magnetic fields so that the corresponding connectors are attracted to each other. It is not a requirement that both the mobile robot 1 and the charging station 80 be equipped with electromagnets. One of the mobile robot 1 and the charging station 80 may be equipped with electromagnets, while the other may be equipped with magnetic materials.

Figure 27:
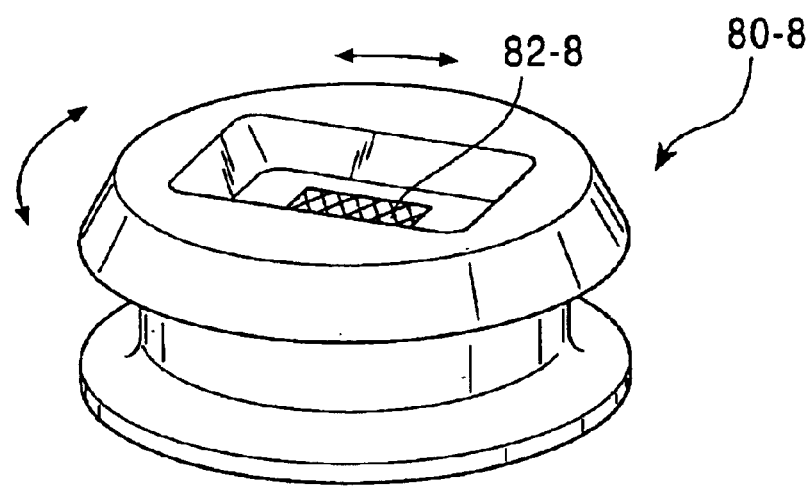
FIG. 27 is an external perspective view of a charging station 80-8 in accordance with an eighth embodiment of the present invention.

FIG. 27 shows the external appearance of a charging station 80-8 of an eighth embodiment of the present invention. Like the charging station 80-1 of the first embodiment shown in FIG. 7, the charging station 80-8 is a box-like charging station that models the bed of the dog-type mobile robot. The charging station 80-8 has a concave on the top side thereof, and a connector 82-8 at the center of the concave.

The charging station 80-8 is rotatable about the Z axis. When the mobile robot 1 approaches the charging station 80-8, the charging station 80-8 is driven so that the mobile robot 1 smoothly moves to the connection position of the connector.

Figure 28:
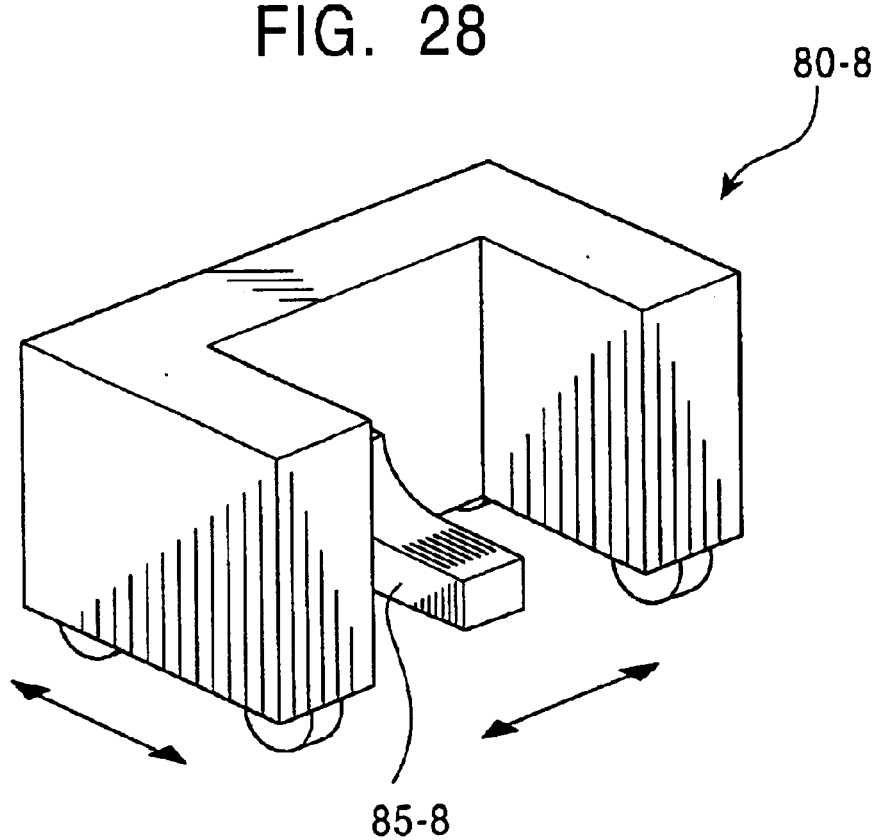
FIG. 28 is an external perspective view of a charging station 80-8' of a modification of the eighth embodiment.

FIG. 28 shows the external appearance of a charging station 80-8' of a modification of the eighth embodiment of the present invention. Like the charging station 80-3 of the third embodiment shown in FIG. 14, the charging station 80-8' has a generally U-shaped structure. The inner walls of the U-shaped structure are tapered to smoothly receive the mobile robot 1 and a lip 85-8 having a connector 82-8 on the top surface thereof extends from the inside bottom surface of the U-shaped structure.

The charging station 80-8' is movable in each of the X and Y axes. When the mobile robot 1 comes close enough, the charging station 80-8 is smoothly driven to the connection position of the connectors.

Figure 29:
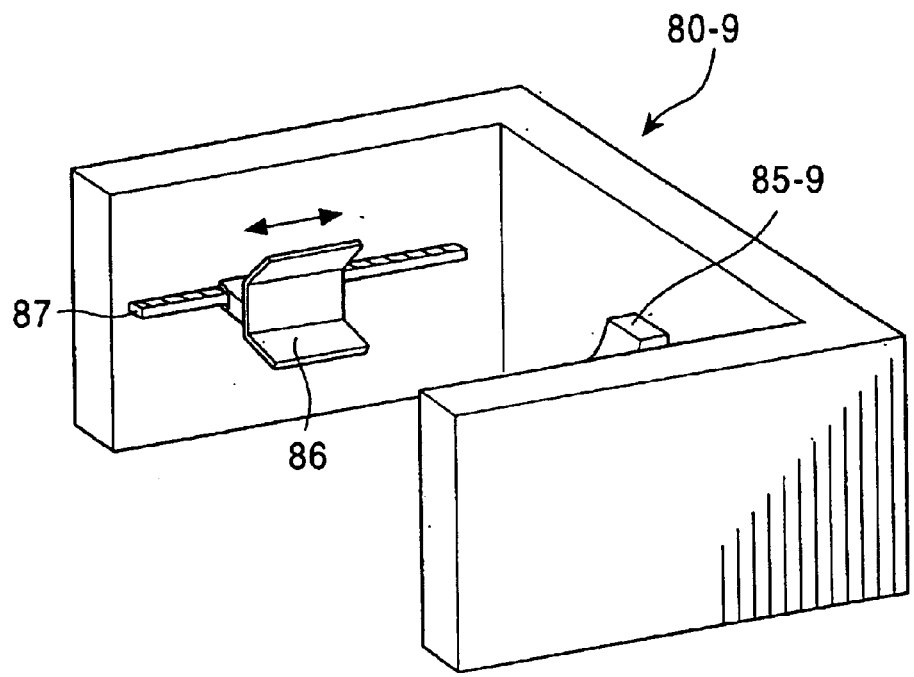
FIG. 29 is an external perspective view of a charging station 80-9 in accordance with a ninth embodiment of the present invention.

FIG. 29 shows the external appearance of a charging station 80-9 of a ninth embodiment of the present invention. Like the charging station 80-3 of the third embodiment shown in FIG. 14, the charging station 80-9 has a generally U-shaped structure. The inner walls of the U-shaped structure are tapered to smoothly receive the mobile robot 1 and a lip 85-9 having a connector 82-8 on the top surface thereof extends from the inside bottom surface of the U-shaped structure.

The U-shaped structure has, on the inner side walls thereof, a pair of grips 86 for gripping the mobile robot 1 on both sides when the mobile robot 1 comes into the U-shaped structure. The grips 86 are supported by respective guide rails in a manner such that the grips 86 slide along the guide rails inwardly toward the inside bottom of the U-shaped structure. The grips 86 gripping the mobile robot 1 thus automatically guide the mobile robot 1 inwardly to the connection position of the connectors.

With the mobile robot 1 docked at the charging station 90-9, the charging station 90-9 may be used as a carrying case for the mobile robot 1. For instance, when the movable robot and the charging station are sold in combination, both the mobile robot and the charging station are packed together with the charging station having the mobile robot docked therewithin for space saving. The walls of the U-shaped structure of the charging station protect the mobile robot 1 from undue force when in transit. The packing of the mobile robot 1 is thus easy and simple.

Figure 30:
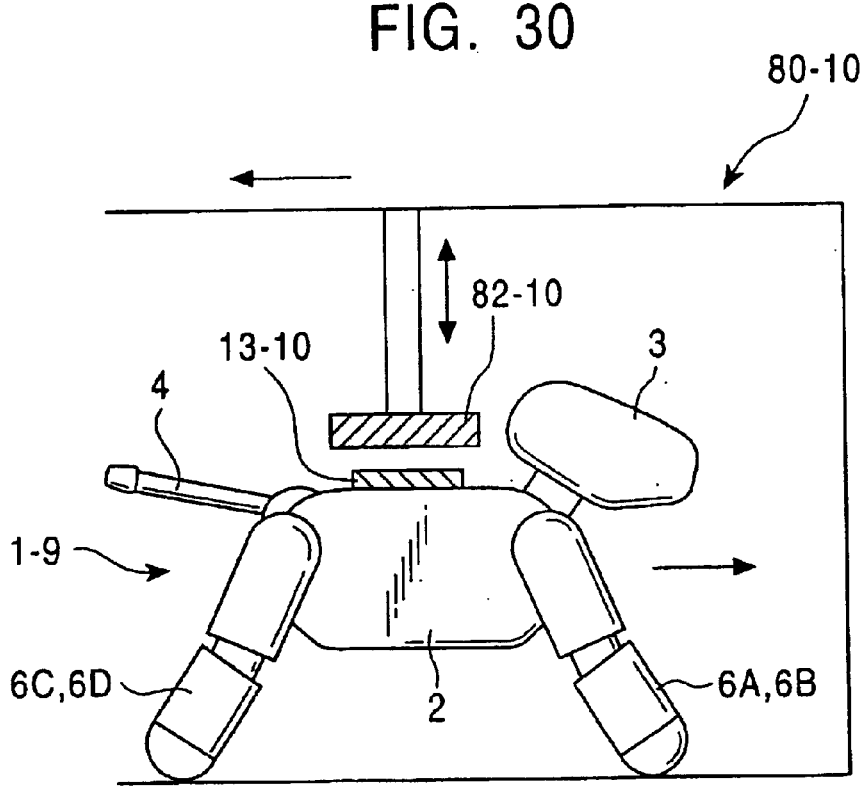
FIG. 30 is an external view of a charging station 80-10 in accordance with a tenth embodiment of the present invention.

FIG. 30 and FIG. 31 show the external appearance of a charging station 80-10 of a tenth embodiment of the present invention. Unlike the preceding embodiments, a connector 13-10 of a mobile robot 1-10 is mounted on the top side, namely, the back of the torso unit 2, rather than on the underside, namely, the abdomen, of the torso unit 2. In the charging station 80-10, a connector 82-10 is attached to the lower end of an arm 88 that is raised and lowered. In response to the docking of the mobile robot 1-10, the charging station 80-10 lowers the arm 88, thereby mating the connector 13-10 to the connector 82-10.

FIG. 31 illustrates the mating mechanism of the connectors 13-10 and 82-10 in detail. As shown, besides electrical connection terminals, the connector 13-10 includes hooks 13-10A and 13-10B. Besides electrical connection terminals, the connector 82-10 includes holes 82-10A and 82-10B through which the hooks 13-10A and 13-10B are respectively received. The connector 82-10 is pivotally hinged near one edge thereof at the lower end of the arm 88.

At a predetermined position relationship between the charging station 80-10 and the mobile robot 1-10, the arm 88 is lowered so that the hooks 13-10A and 13-10B are received into the holes 82-10A and 82-10B. With the arm 88 lowered, the connector 82-10 is hinged so that the connectors 13-10 and 82-10 are mated to each other with their contact faces put into contact.

FIG. 32 illustrates a mating mechanism of connectors 13-10' and 82-10' of a modification of the tenth embodiment of the present invention. Like the second embodiment shown in FIG. 12, the connector 13-10' is formed of a plurality of frustohemispherical terminals, into which the hemispherical projection is cut. The connector 82-10' is a bowl-like structure that receives the connector 13-10'. At a predetermined position, the arm 88 is lowered to mate the connector 82-10' to the connector 13-10'.

Figure 33:
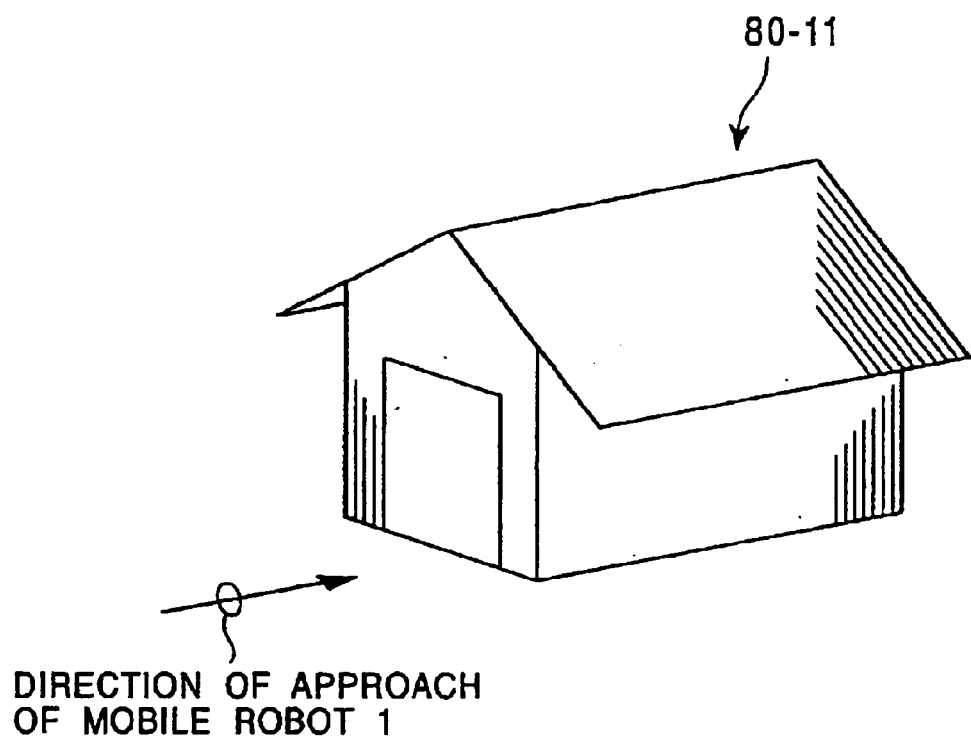
FIG. 33 is an external perspective view showing a charging station 80-11 of an eleventh embodiment of the present invention.

FIG. 33 shows the external appearance of a charging station 80-11 of an eleventh embodiment of the present invention. As shown, the charging station 80-11, imitating a kennel, is combined with the dog-type toy robot 1. Connectors are mated with the charging station 80-11 housing the mobile robot 1. In this case, the charging operation of the mobile robot 1 metaphorically represents a dog entering its kennel, thereby presenting more fun.

Figure 34:
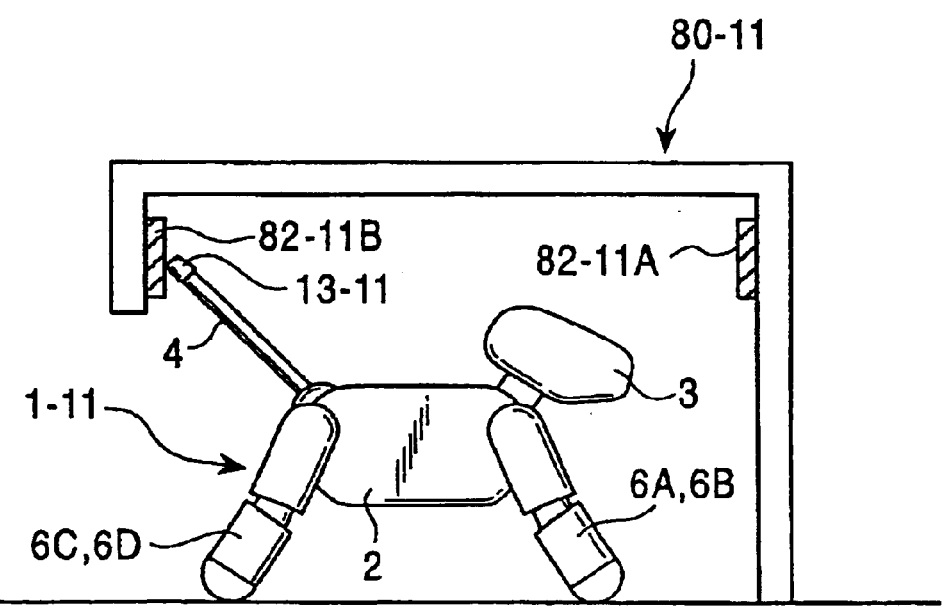
FIG. 34 shows a connector-mating method in the eleventh embodiment of the present invention.

FIG. 34 illustrates a connector-mating method in the eleventh embodiment of the present invention. As shown, the charging station 80-11 includes a connector 82-11A on the upper portion of the inner surface of the rear wall and a connector 82-11B on the upper portion of the inner surface of the front wall. A connector 13-11 is arranged on the end of the tail 4 of a mobile robot 1-11. With the mobile robot 1-11 standing at a predetermined position, the tail joint 8 is driven to press the connector 13-11 to the front connector 82-11B.

Figure 35:
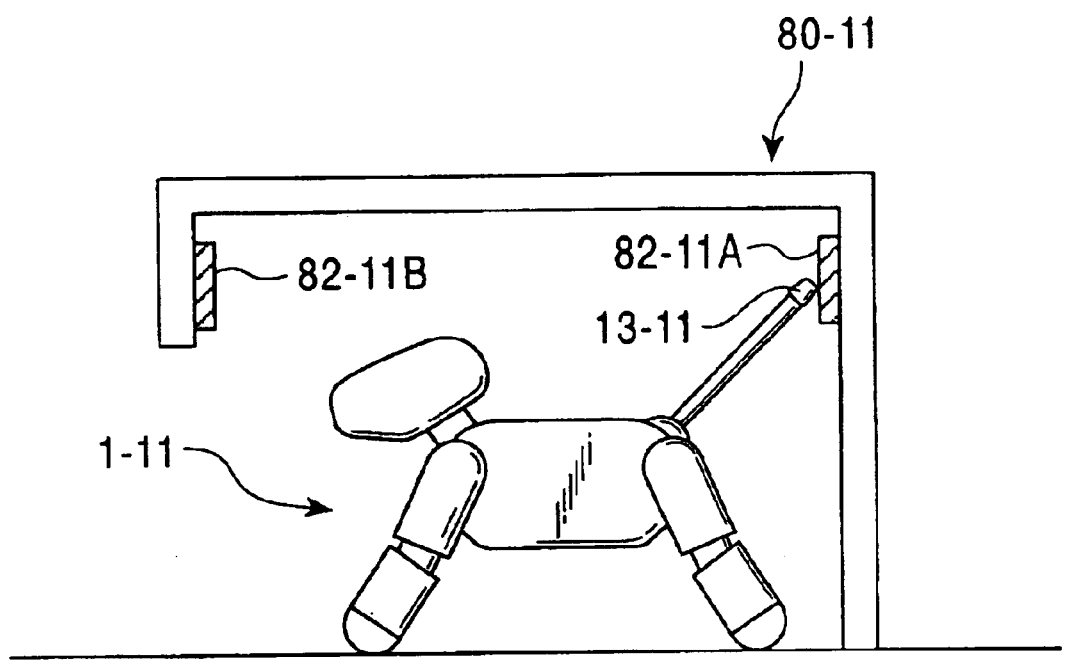
FIG. 35 shows another connector-mating method in the eleventh embodiment of the present invention.

FIG. 35 illustrates another connector-mating method in the eleventh embodiment. In this example, the mobile robot 1-11 stands at a predetermined position, opposite to the direction shown in FIG. 34, in the kennel 80-11. By driving the tail joint 8, the connector 13-11 is pressed against the rear connector 82-11A.

When the end of the tail 4 is used as an electrode as shown in FIG. 34 and FIG. 35 and the electrode is a single electrode for positive or negative, the other electrode needs to be arranged. If an electrode is arranged on the sole of the foot as shown in FIG. 17, the electrical connection is established by a natural action of stamping at a predetermined position on a floor of the kennel 80-11.

The tail 4 is an elongated bar, and the positioning of the tail 4 to be mated to the connector 13-11 is difficult for its rigidity. When the end of the tail 4 is used as an electrode as shown in FIG. 34 and FIG. 35, the connectors are arranged to be attracted by the magnetic field of electromagnets.

Figure 36:
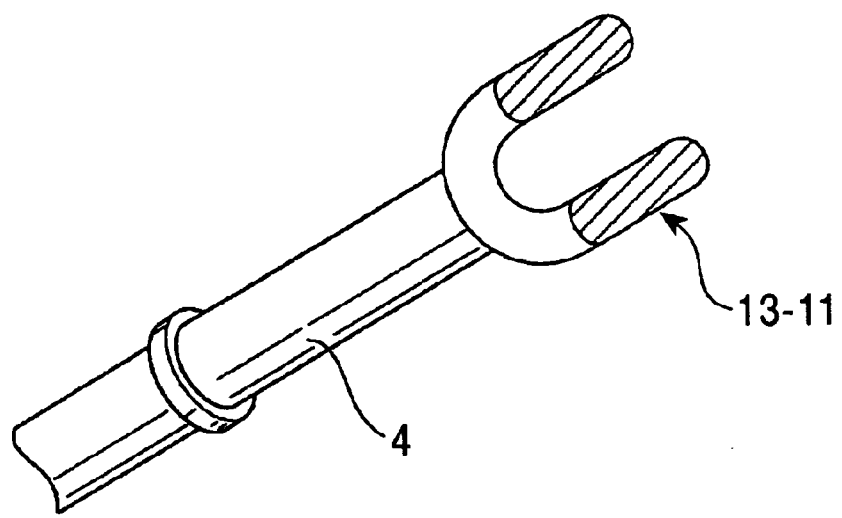
FIG. 36 shows a connector 13-11 arranged on the tip of a tail 4.

FIG. 36 illustrates the connector 13-11 arranged on the end of the tail 4. As shown, the connector 13-11 has a bifurcated structure, with the two branches assigned positive and negative polarities. This arrangement needs no further electrical contact points, and the operation of the tail 4 performs electrical connection and charging.

When the end of the tail 4 has one contact point only (namely, one electrode), the other contact point is needed. In this case, a contact (not shown) is arranged on the floor of the kennel 80-11 and a facing contact is mounted on the sole of the foot of the mobile robot 1-11 (see FIG. 17 and FIG. 18). The electrode connection and the charging are thus performed by a natural action of stamping on the floor.

Figure 37:
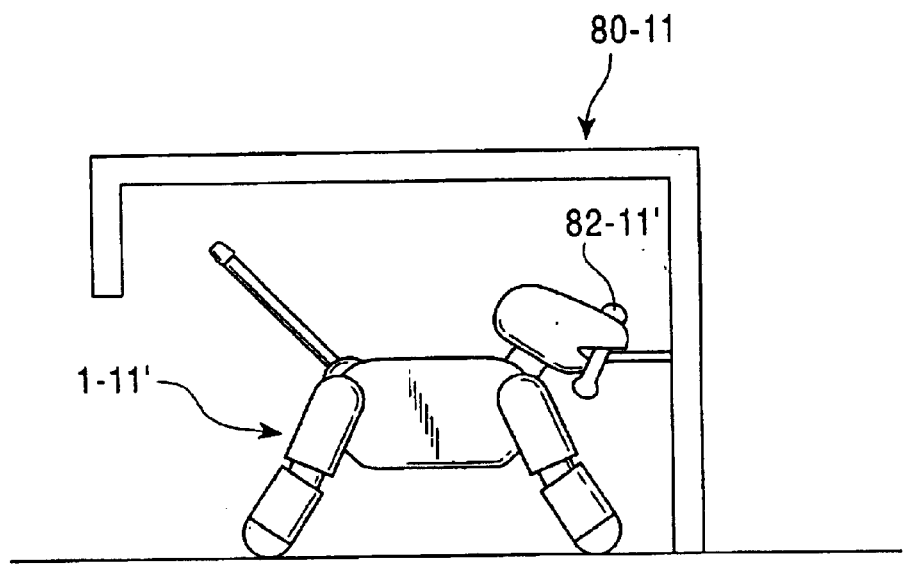
FIG. 37 shows the internal construction of a kennel forming a charging station 80-11' in a modification of the eleventh embodiment.

FIG. 37 shows the internal construction of a charging station 80-11' of a modification of the eleventh embodiment of the present invention. As shown, a connector 82-11' of the charging station 80-11', imitates a "bone" as food for the dog. A mobile robot 1-11' has a connector 13-11' with its terminal imitating teeth in the mouth of the dog. In this case, the charging operation metaphorically represents giving the food to the dog, increasing fun in the operation of the robot.

Figure 39:
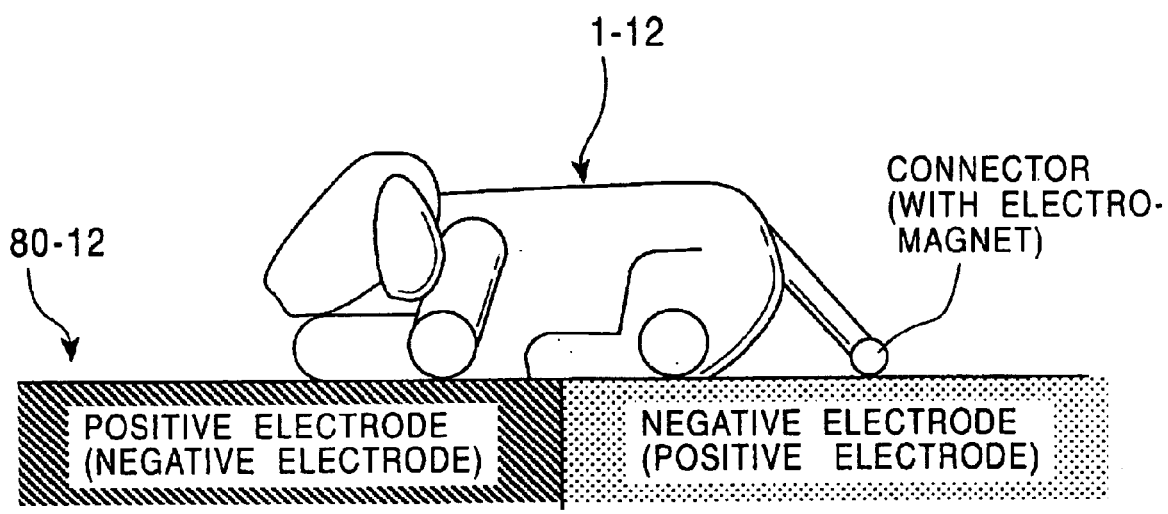
FIG. 39 shows an electrical connection between a charging station 80-12 and a mobile robot 1-12 in accordance with a twelfth embodiment of the present invention.

FIG. 39 shows an electrical connection established between a charging station 80-12 and a mobile robot 1-12 in accordance with a twelfth embodiment. As shown, a positive electrode and a negative electrode are embedded in the predetermined floor within the work space. The mobile robot 1-12 has a positive (negative) electrode on the underside of the front half of the torso and a negative (positive) electrode on the underside of the rear half of the torso. The charging operation thus metaphorically represents relaxing by lying down as shown in FIG. 39.

As described above, the present invention provides an excellent charging mechanism for a self-controlled and rechargeable-battery-driven mobile robot.

The present invention provides an excellent charging mechanism for a battery-driven mobile robot which freely and tracklessly moves within a work space.

The present invention provides an excellent charging mechanism which charges, with a charging station, a mobile robot which freely and tracklessly moves within a work space.

The present invention provides an excellent charging mechanism which correctly and reliably electrically connects to a mobile robot which stops at a charging operation for recharging.

The present invention has been discussed with respect to the preferred embodiments thereof. It is obvious that one having ordinary skill in the art could make modifications and equivalent arrangements without departing from the scope of the present invention. The above described preferred embodiments are intended to illustrate the principles of the invention, but not to limit its scope. Accordingly, the invention should be limited only by the spirit and scope of the appended claims.

What is claimed is:

1. A charging system for a mobile robot comprising the mobile robot that is battery-driven and moves in a self-controlled way within a work space, and a charging station for accommodating the mobile robot for a battery charging operation, the mobile robot being of the at least four-footed type which walks like an animal and has a power connector on the abdomen of a torso unit thereof, the charging system comprising:

a concave receptacle with a power connector on the inner bottom portion of the receptacle; wherein the receptacle supports the mobile robot in a lying down position;

visible recognition data arranged in a predetermined location of the charging station;

image pickup means mounted on the mobile robot;

calculating means for calculating a range and a bearing from the mobile robot to the charging station, based on an image picked up by the image pickup means; and searching means for causing the mobile robot to search for the charging station, based on the calculation result provided by the calculating means.

2. A charging system according to claim 1, further comprising communication means for performing data exchange between the mobile robot and the charging station.

3. A charging system according to claim 1, wherein the visible recognition data is a print medium glued onto the surface of the charging station.

4. A charging system according to claim 1, wherein the visible recognition data is formed on a print medium, and a plurality of print media is glued onto the surface of a three-dimensional object.

5. A charging system according to claim 1, wherein the visible recognition data is displayed on a screen of a display unit.

6. A charging system according to claim 1, wherein the visible recognition data is displayed on a screen of a display unit, and is dynamically used in a manner that prevents the visible recognition data from being merged into the environment of the work space.

7. A charging system according to claim 1, wherein the visible recognition data is displayed on a screen of a display unit and is changed in response to a range from the mobile robot.

8. A charging system according to claim 1, wherein the visible recognition data is a combination of colors and patterns.

9. A charging system according to claim 1, wherein the visible recognition data is a two-dimensional bar code.

10. A charging system according to claim 1, wherein the visible recognition data is arranged on an elevated portion of the charging station.

11. A charging system according to claim 1, wherein at least one of the charging station and the mobile robot comprises an indicator indicating the condition of a battery.

12. A charging system according to claim 1, wherein the charging station further comprises transmitter means that transmits at least one of light ray, infrared ray, sound wave, ultrasonic wave, radio wave, and magnetic field, the mobile robot comprises receiver means for receiving the wave transmitted from the transmitter means, and wherein the calculating means calculates the range and the bearing from the mobile robot to the charging station, based on at least one of the image provided by the image pickup means and data received by the receiver means.

13. A charging system according to claim 12, wherein the wave transmitted by the transmitter means is easily discriminated and separated from other signals created within the work space.

14. A charging system according to claim 1, wherein the mobile robot comprises a head unit which performs a scanning motion with respect to a torso unit, and at least one of the image pickup means and the receiver means is arranged on the head unit.

15. A charging system according to claim 12, wherein the transmitter means transmits at least two signal waves, from among light ray, infrared ray, sound wave, ultrasonic wave, radio wave, and magnetic field, and the receiver means switches the received signal in response to the range between the charging station and the mobile robot.

16. A charging system according to claim 12, wherein the transmitter means projects light ray through a slit, and changes the pattern of the slit depending on the direction of light projection.

17. A charging system according to claim 12, wherein the transmitter means transmits at least two signal waves that are different in output intensity and frequency component.

18. A charging system according to claim 1, wherein the charging station comprises communication means for exchanging data with a device other than the devices of the charging system.

19. A charging system according to claim 12, wherein the transmitter means transmits is arranged external to the charging station.

20. A charging system according to claim 1, wherein the charging station comprises, on the wall thereof, color patterns painted in at least two colors, and the mobile robot searches for the charging station, based on the positional relationship of the color patterns in an image provided by the image pickup means.

21. A charging system according to claim 1, wherein the mobile robot is of the four-footed type which quadrupedally walks like a dog, and comprises a power connector on the hip portion of the torso unit thereof, the charging station comprises a receptacle with a bowl-shaped concave, and a generally semi-spherical projection on the generally central position of the bowl-shaped concave, and the receptacle supports the mobile robot in the sitting position thereof.

22. A charging system according to claim 1, wherein the mobile robot is of the four-footed type which quadrupedally walks like a dog, and comprises a power connector on the hip portion of the torso unit thereof, the charging station comprises a receptacle with a bowl-shaped, rotationally symmetric concave, and a generally semi-spherical, rotationally symmetric projection on the generally central position of the bowl-shaped concave, and the receptacle supports the mobile robot in the sitting position thereof at any angle.

23. A charging system according to claim 1, wherein the mobile robot has a tapered portion on at least one of a head unit, and shoulders and hip portions of a torso unit, and the charging station comprises a generally U-shaped structure having an inner wall which receives the tapered portion formed on the mobile robot.

24. A charging system according to claim 1, wherein the mobile robot has a tapered portion on at least one of a head unit, and shoulders and hip portions of a torso unit, and the charging station comprises a generally U-shaped structure having an inner wall which receives the tapered portion formed on the mobile robot, and on the deepest inside position of the U-shaped structure, a lip having a connector arranged on the top surface thereof.

25. A charging system according to claim 1, wherein the mobile robot has a tapered portion on at least one of a head unit, and shoulders and hip portions of a torso unit, and the charging station comprises a generally U-shaped structure having an inner wall which receives the tapered portion formed on the mobile robot, and on the deepest inside position of the U-shaped structure, a lip having a connector arranged on the top surface thereof, and each terminal of the connector extends inwardly deeply into the U-shaped structure.

26. A charging system according to claim 1, wherein the mobile robot is ambulatory, and an electrode terminal is arranged on the sole of at least one foot.

27. A charging system according to claim 1, further comprising at least one electromagnet for generating a magnetic field that connects and disconnects the connector of the mobile robot to and from the connector of the charging station.

28. A charging system according to claim 1, wherein the charging station comprises a drive mechanism for placing the mobile robot in an appropriate engagement position therewith.

29. A charging system according to claim 1, wherein the charging station comprises a generally U-shaped structure that receives the mobile robot, and grip means for gripping the mobile robot within the U-shaped structure.

30. A charging system according to claim 1, wherein the charging station comprises a generally U-shaped structure that receives the mobile robot, and grip means for gripping the mobile robot within the U-shaped structure, and wherein the charging station is used as a carrying case with the mobile robot gripped therewith in.

31. A charging system according to claim 1, wherein the mobile robot is of the type that quadrupedally walks like a dog, and the charging station has a kennel-like configuration, and at least one connector is arranged on the inner wall of the charging station.

32. A method for searching for a charging station, based on a signal wave transmitted by a transmitter arranged external to the charging station in a charging system comprising a mobile robot that is battery-driven and moves in a self-controlled way within a work space, and the charging station for accommodating the mobile robot for a battery charging operation, the mobile robot being ambulatory and having at least a torso unit and at least two foot units, comprising an electrode terminal for power feeding, on one of the abdomen of the torso unit and the back of the torso unit, the method comprising the steps of:

teaching the position of the charging station based on the signal wave from the transmitter after the mobile robot has been placed on the charging station, and searching for the charging station by calculating the range and bearing to the charging station, based on the signal wave from the transmitter, with the mobile robot at any position within the work space.

33. A method for searching for a charging station, based on a signal wave transmitted by a transmitter arranged external to the charging station in a charging system comprising a mobile robot that is battery-driven and moves in a self-controlled way within a work space, and the charging station for accommodating the mobile robot for a battery charging operation, the mobile robot being ambulatory and having at least a torso unit and at least two foot units, comprising an electrode terminal for power feeding, on one of the abdomen of the torso unit and the back of the torso unit, the method comprising the steps of:

storing beforehand, in a memory of the mobile robot, the position information of the charging station with respect to a reference position set in accordance with the position of the transmitter, and searching for the charging station by calculating the position of the mobile robot with respect to the reference position, based on the signal wave from the transmitter with the mobile robot at any position within the work space, and reading the position information from the memory to calculate the range and the bearing to the charging station.

34. A method for searching for a charging station, based on a signal wave transmitted by a transmitter arranged external to the charging station in a charging system comprising a mobile robot that is battery-driven and moves in a self-controlled way within a work space, and the charging station for accommodating the mobile robot for a battery charging operation, the mobile robot being ambulatory and having at least a torso unit and at least two foot units, comprising an electrode terminal for power feeding, on one of the abdomen of the torso unit and the back of the torso unit, the method comprising:

a calculating step in which the mobile robot calculates the position thereof with respect to a reference position set in accordance with the position of the transmitter, based on the signal wave from the transmitter, in the calculating step the charging station calculates the position thereof with respect to the reference position, based on the signal wave from the transmitter, a communication step in which the charging station communicates the position information thereof to the mobile robot, and a searching step in which the mobile robot searches for the charging station by calculating the range and bearing to the charging station through a relative relationship between the position information.

* * * * *